United States Patent [19]

Takahashi

[11] Patent Number: 5,610,885
[45] Date of Patent: Mar. 11, 1997

[54] LINEAR DRIVE MECHANISM FOR USE IN AN OPTICAL DISK DEVICE

[75] Inventor: Naomasa Takahashi, Yokohama, Japan

[73] Assignee: Kabushiki Kaisha Toshiba, Kawasaki, Japan

[21] Appl. No.: 527,895

[22] Filed: Sep. 14, 1995

[30]     Foreign Application Priority Data

Sep. 19, 1994  [JP]  Japan .................................. 6-222308

[51] Int. Cl.$^6$ ................................................. G11B 7/085
[52] U.S. Cl. .................................. 369/44.28; 369/44.29; 369/44.14; 369/44.25; 369/32
[58] Field of Search .......................... 369/44.28, 44.29, 369/44.25, 44.32, 44.34, 44.14, 44.2, 44.22, 54, 32, 44.35, 44.36; 360/77.03, 78.04, 78.05, 78.06

[56]           References Cited

U.S. PATENT DOCUMENTS 5,033,037  7/1991  Yanagi ................................. 369/44.28
5,285,431  2/1994  Ogawa .................................... 369/32
5,291,464  3/1994  Osada ................................. 369/44.28
5,351,222  9/1994  Ikeda et al. ........................ 369/44.29
5,442,604  8/1995  Osada ................................. 369/44.25
5,493,546  2/1996  Kasahara ............................. 369/44.14

*Primary Examiner*—Thang V. Tran
*Attorney, Agent, or Firm*—Cushman, Darby & Cushman IP Group of Pillsbury & Madison & Sutro LLP

[57]           ABSTRACT

According to an optical head device access mechanism, drive coils, which provide propulsive force for moving an objective lens, and position sensors, which detect the position of the slide base, are arranged at a position where all driving force and frictional force corresponding to the driving force can be surely detected. The present position of the slide base corresponding to a level of a drive current supplied to the drive coils and its moving speed are converted to a compensation driving current for generating driving force corresponding to driving force lost by frictional force by a position/speed controlling circuit.

19 Claims, 18 Drawing Sheets

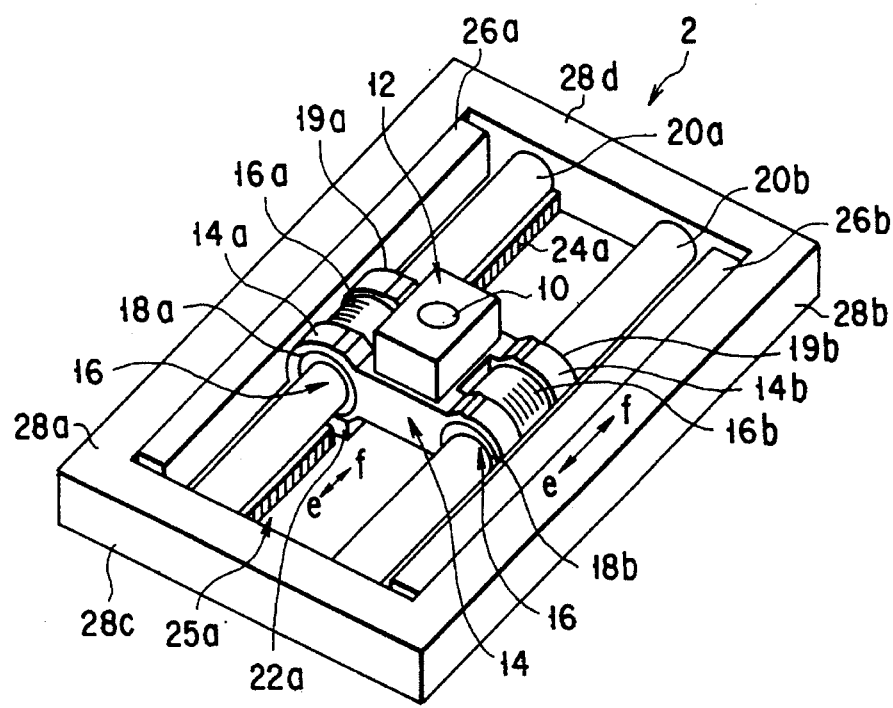
FIG. 1
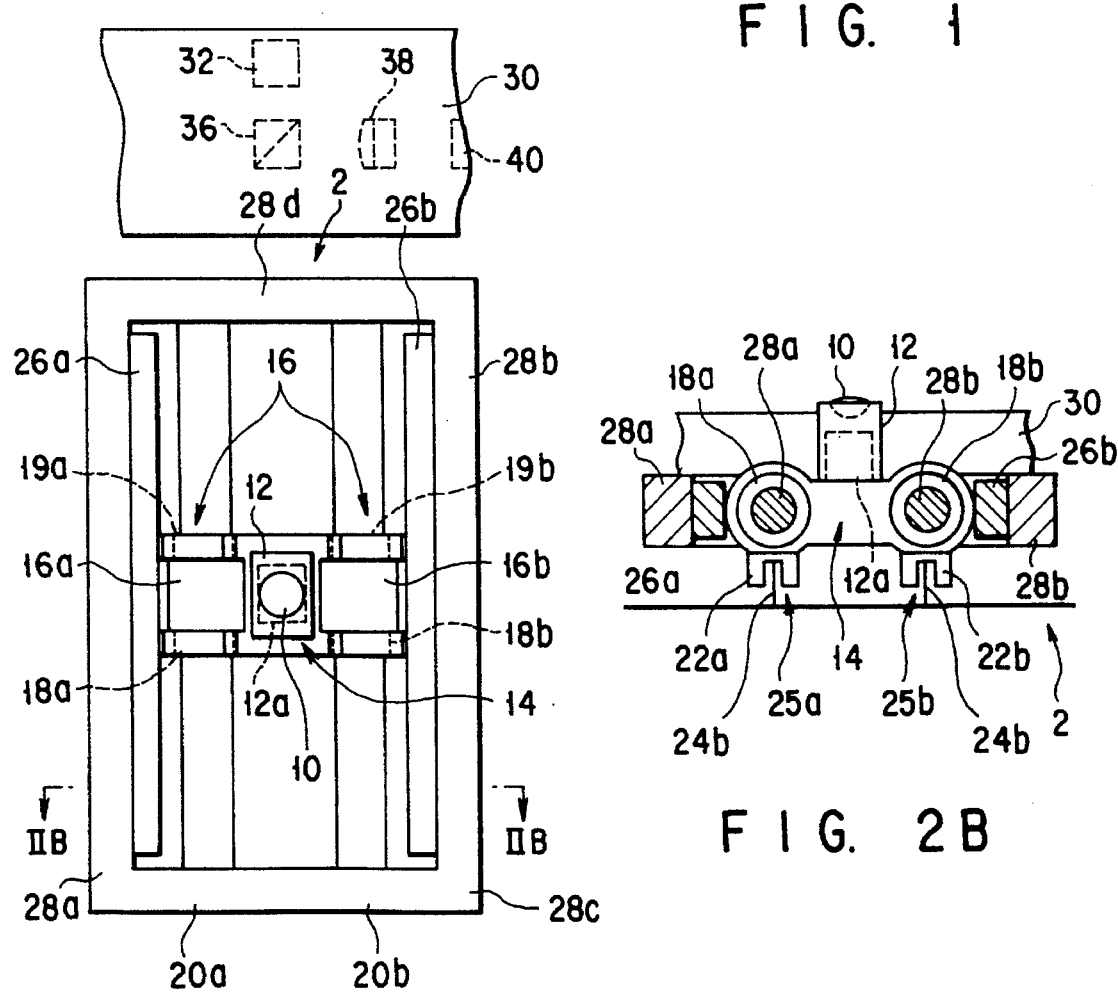
FIG. 2A
FIG. 2B

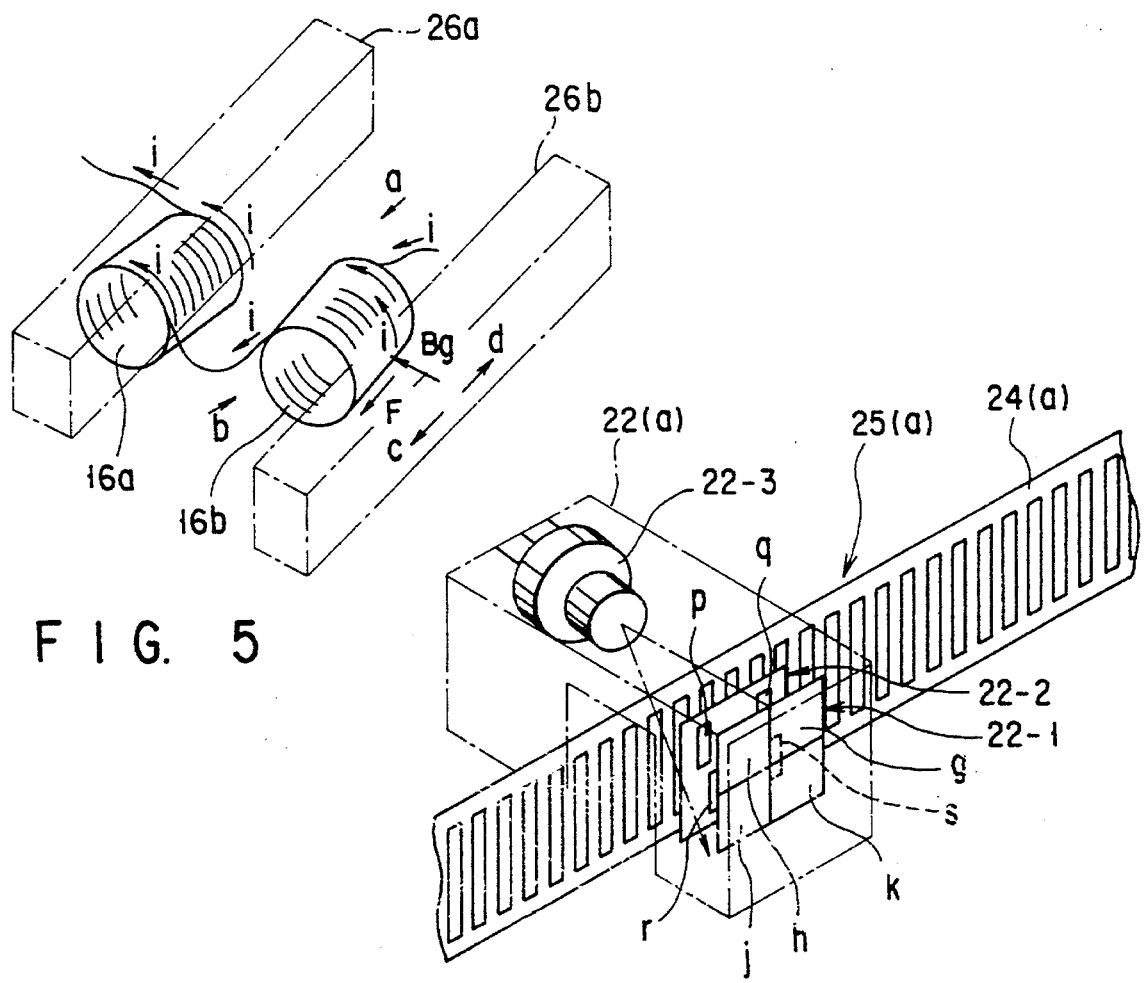
FIG. 5
FIG. 6A
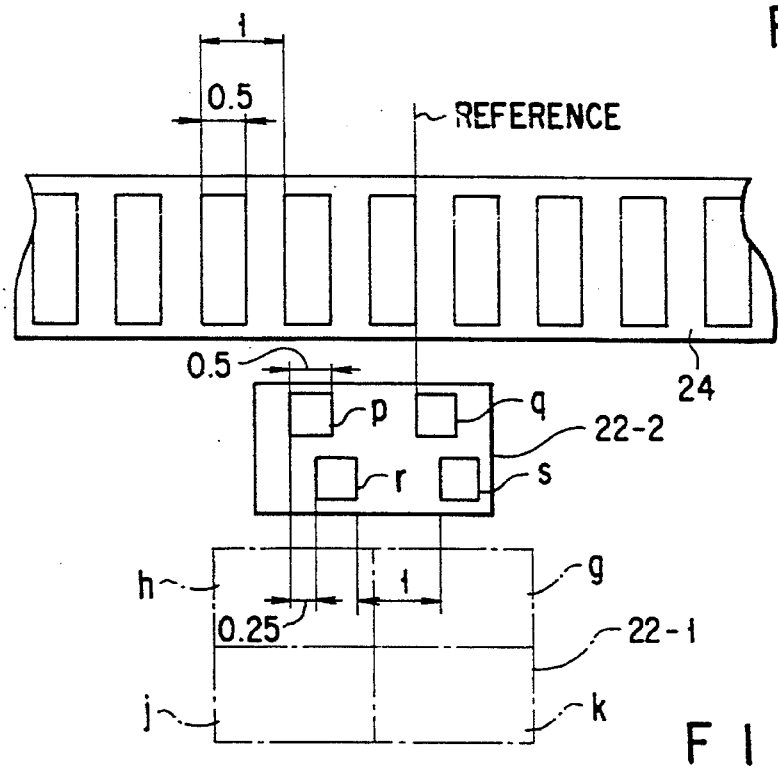
FIG. 6B

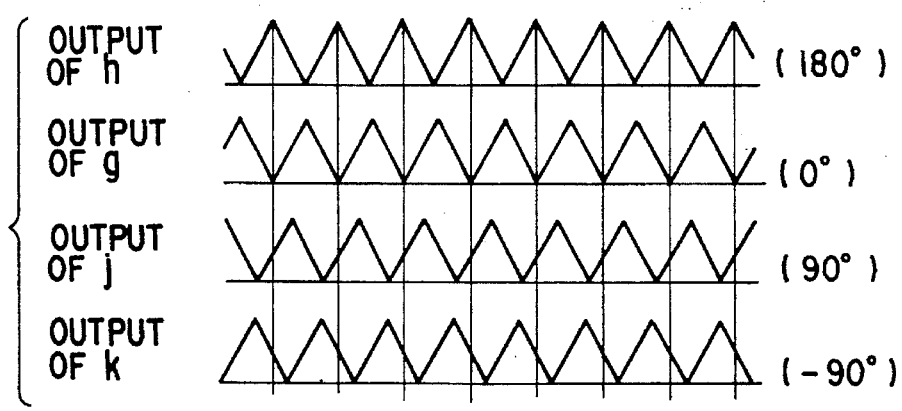
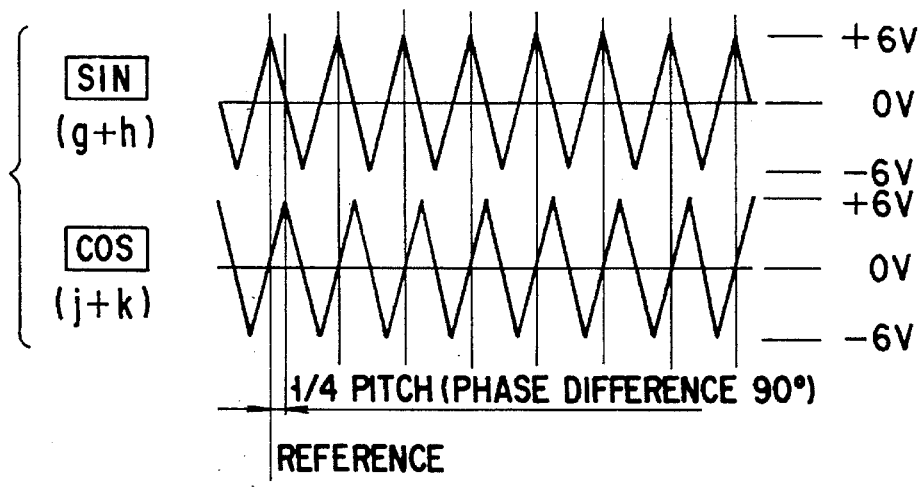
FIG. 7A, FIG. 7B
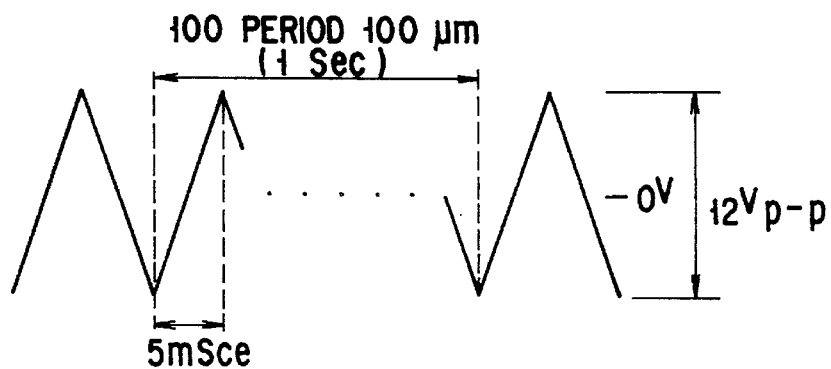
FIG. 9

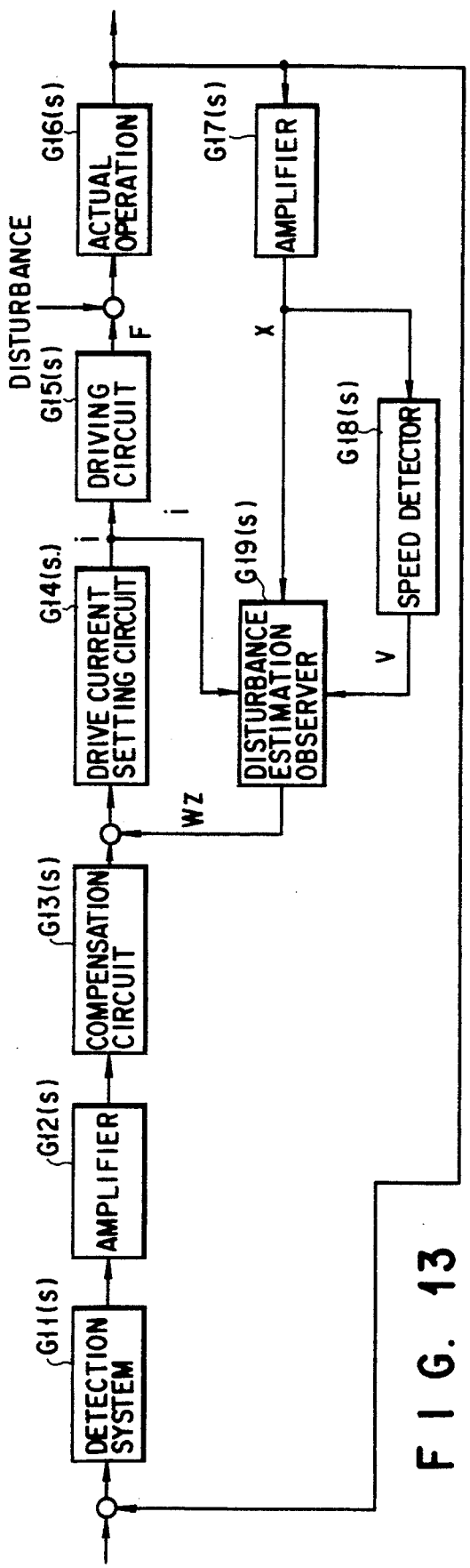
F I G. 13

| BEFORE COMPENSATION | AFTER COMPENSATION |
|---|---|
|  |  |
| EQUATION OF MOTION | |
| $m \frac{dx^2}{d^2 0} = F + f$ $= Ftr + f$ | $m \frac{dx^2}{d^2 0} = F + f$ $= Ftr + fz + f$ $= Ftr$ |
| | f: FRICTION, AND fz: FORCE OF COMPENSATION |

BEFORE MODELED

ANALYSIS

AFTER MODELED
(PRESENT INVENTION)

LINEAR DRIVE MECHANISM FOR USE IN AN OPTICAL DISK DEVICE

BACKGROUND OF THE INVENTION

1. Field of the Invention

This invention relates to a linear drive mechanism for use in an optical disk device, and more particularly a method for controlling a linear motor to move an objective lens for providing a beam waist of an optical beam to a recording surface of the optical disk and extracting a light beam reflected by the recording surface of the optical disk along the recording surface.

2. Description of the Related Art

Generally, an optical disk device includes an optical head, a linear moving mechanism, a position controlling section, a loading mechanism, a disk driving section, and a signal controlling section. The optical head is used to focus a laser beam onto an optical disk to write data to the optical disk and read from the optical disk. The linear moving mechanism is used to roughly move the optical head along a recording surface of the optical disk. The position controlling section is used to control the optical head and the linear moving mechanism. The loading mechanism is used to guide the optical disk to a predetermined position. The disk driving section is used to rotate the optical disk at a predetermined speed. The signal controlling section is used to read data recorded in the optical disk and store data in the optical disk.

The optical head has a laser device, a light transmission member, an objective lens, a photodetector, a lens holder, a focusing mechanism, and a tracking mechanism.

The laser device generates a laser beam, which is used to write data to the optical disk and to read data from the optical disk. The light transmission member guides the laser beam from the laser device, and separates the laser beam reflected by the optical disk from the laser beam directing to the optical disk from the laser device. The objective lens is used to focus the laser beam from the laser device onto the surface of the optical disk by a predetermined beam spot size, and to receive the laser beam reflected by the optical disk to be restored to a predetermined beam spot size. The photodetector detects the laser beam picked up by the objective lens to be converted to an electrical signal. The lens holder holds the objective lens to be movable in an arbitrary direction. The focusing mechanism is used to move the lens holder with the objective lens to a direction perpendicular to the recording surface of the optical disk, that is, focus direction in accordance with an output from the photodetector, so that the laser beam, which is sent from the laser device and passed through the objective lens, is correctly focused on a predetermined position of the optical disk. The tracking mechanism is used to move the lens holder, that is, the objective lens in a direction, which is parallel to the recording surface of the optical disk and perpendicular to the track, in accordance with the output from the photodetector, so that a center of the laser beam, which is sent from the laser device and passed through the objective lens, is conformed to a center of the track formed in the recording surface of the optical disk.

The linear moving mechanism has a base member, a guide rail, a support member, a moving coil, and a magnetic circuit.

The base member supports the optical head to be movable along the surface of the optical disk. The guide rail guides the base member. The support member is provided between the base member and the guide rail to reduce an axial addition between the base member and the guide rail. The moving coil generates magnetic force for moving the optical head along the guide rail. The magnetic circuit provides magnetic flux for converting magnetic force generated by the moving coil to driving force. In order to reduce the manufacturing cost of the optical disk device, there has been recently used a solid bearing of reasonable cost, for example, oil impregnation bush.

In this type of the optical disk device, the optical disk is guided to a predetermined position by the loading mechanism, and the optical disk is rotated at a predetermined speed by the disk driving section. Then, a laser beam having a predetermined light density is generated from the laser device by the control of the signal controlling section. A distance between the objective lens and the recording surface of the optical disk is focus-locked to a fixed value based on the laser beam. Under this state, a predetermined current is supplied to the moving coil of the linear moving mechanism by the tracking control of the position controlling section. Thereby, the objective lens, that is, lens holder is moved and the center of the laser beam passed through the objective lens is conformed to the center of the track, and the center of the laser beam passed through the objective lens is conformed to the track of the innermost periphery of the optical disk.

Thereafter, a predetermined current is supplied to the moving coil of the linear moving mechanism from the position controlling section, so that the optical head, that is, the objective lens is roughly moved in the vicinity of a target track directed by the signal controlling section. Sequentially, the center of the target track and the center of the laser beam passed through the objective lens are slightly moved to be conformed to each other by a track jump of the tracking mechanism of the lens holder.

Header data of the optical disk is checked by the signal control section based on the reflected light from the track moved by the close access, that is, the track jump. Then, when the target track directed by the signal controlling section and the track moved by the jump are conformed to each other, data is written to the target track or read from the target track.

As mentioned above, in the optical disk device, which has been recently used, the optical head is moved by the linear moving mechanism, and the objective lens is moved by the tracking mechanism. In other words, the objective lens is moved to the target track by two moving mechanisms, that is, linear moving mechanism, and the tracking mechanism. Therefore, there are problems in the point that the cost of parts, which are necessary to provide the optical head access mechanism, and the cost of assembling the optical disk device are increased.

There has been tried that the tracking mechanism of the objective lens is omitted and the tracking is controlled by only the linear moving mechanism. However, in many cases, since friction (axial thrust load) between the guide rail of the linear moving mechanism and the support member is large, it is substantially difficult to newly move the objective lens (optical head), which is moved in the vicinity of the target track, by an amount corresponding to several tracks.

As a method for reducing friction (axial addition), there has been proposed an example using a high accurate bearing, serving as a support member, in which friction between the support member and the guide rail is sufficiently reduced. However, the high accurate bearing is extremely expensive, and there is generated a problem in which the manufacturing cost of the optical disk device is more increased if such a high accurate bearing is used.

SUMMARY OF THE INVENTION

An object of the present invention is to provide an optical head access mechanism of an optical disk device in which tracking control can be performed by only a linear moving mechanism.

Another object of the present invention is to provide an optical head access mechanism in which a coil driving current in which currents having a plurality of patterns are superimposed is supplied to the drive coils, so that a tracking can be easily controlled to move the objective lens to a a position corresponding to the a target track of the optical disk.

Moreover, another object of the present invention is to provide an optical head access mechanism, which can control a coil driving currents movable a moving distance defined in accordance with the number of tracks provided between a target track to be moved and the position of the present track on which the light is focused through the objective lens, and the coil driving current movable the moving distance defined in accordance with a characteristic variation of the position of the present track where the light is focused through the objective lens by influence of concentricity of the recording surface of the optical disk by the same current supply circuit.

According to a first aspect of the present invention, there is provided a linear drive mechanism comprising an objective lens for focusing light on a recording surface of an optical disk; a lens actuator for movably holding the objective lens in a direction perpendicular to the recording surface; a slide base for movably holding the lens actuator to be parallel to the recording surface; driving coils, placed at a predetermined position of the slide base, for providing propulsive force for moving the slide base; guide rails for guiding the slide base when the slide base is moved to be parallel to the recording surface; sliding members, fixed to a predetermined position between the slide base and the guide rails, for reducing friction between the slide base and the guide rails; linear scales, provided at a predetermined range in connection with an area where the slide base is movable to be along the guide rails, for outputting a signal corresponding to a present position of the slide base; a coil current supplying circuit for supplying a driving current to the drive coils; position sensors, provided at a predetermined position of the slide base, for detecting the present position of the slide base in connection with the linear scales; frictional force estimating circuit for estimating level of frictional force generated between the guide rails and the moving members based on the present position of the slide base detected by the position sensors, a level of the driving current supplied to the drive coils from the coil current supply current, and a speed at which the slide base is moved; and a drive current compensation circuit for compensating for the level of the drive current supplied to the drive coils from the coil current supply circuit so as to cancel the level of the frictional force estimated by the frictional force estimating circuit.

According to a second aspect of the present invention, there is provided a linear drive mechanism comprising a focusing means for focusing light on a recording surface of a recording medium; holding means for movably holding the focusing means in a direction perpendicular to the recording surface; moving means for moving the holding means to be parallel to the recording surface; position detecting means for detecting a position of the moved moving means; driving means for driving the moving means; guiding means for guiding the moving means when the moving means is moved to be parallel to the recording surface; and compensating means for estimating a level of a driving force canceling component generated between the guiding means and the moving means, and a level of a vertical resistance working between the holding means and the moving means, based on the position of the moving means detected by the position detecting means, a level of driving force supplied to the moving means from the driving means, and a speed at which the moving means is moved, so as to compensate for the level of driving force supplied to the moving means from the driving means.

According to a third aspect of the present invention, there is provided a linear drive mechanism comprising focusing means for focusing light on a recording surface of a recording medium; holding means for movably holding the focusing means in a direction perpendicular to the recording surface; moving means for moving the holding means to be parallel to the recording surface; position detecting means for detecting a position of the moved moving means; driving means for driving the moving means; guiding means for guiding the moving means when the moving means is moved to be parallel to the recording surface; and compensating means for estimating a level of a driving force canceling component generated between the guiding means and the moving means based on the position of the moving means detected by the position detecting means, a level of driving force supplied to the moving means from the driving means, and a speed at which the moving means is moved, so as to compensate for the level of driving force supplied to the moving means from the driving means.

According to the optical head access mechanism of the present invention, the drive coils, which provide propulsive force to move the slide base holding the objective lens, that is, the lens actuator and the position sensor, which detects the position of the slide base, are arranged at a position where influence of secondary resonance caused by the vibration of the moving section can be reduced, and all driving force applied to the slide base and frictional force corresponding to the driving force can be surely detected.

The position sensor can detect the present position (displacement) and the moving speed of the slide base in accordance with the level of the driving current supplied to the drive coils. Due to this, in the drive control when the slide base is moved to the target track, influence of frictional force, which causes the tracking error, can be correctly detected.

Then, the compensation driving current is supplied to the drive coils in advance to generate driving force corresponding to driving force lost by frictional force. Thereby, the target track, which is displaced by eccentricity of the optical disk, can be tracked well.

Thereby, there can be provided an optical head which does not need the tracking mechanism for track jump.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view showing an optical head device in which a linear drive mechanism is used according to an embodiment of the present invention;

FIG. 2A is a plane view of the optical head of FIG. 1;

FIG. 2B is a cross sectional view of the optical head shown in FIG. 2A at line IIB—IIB;

FIG. 5 is a schematic view showing a direction of a current to be supplied to a drive coils of the optical head device of FIGS. 1, 2A and 2B, and a direction of driving force generated in the drive coils;

FIG. 6A is a schematic view showing an example of a position sensor of the optical head device of FIGS. 1, 2A and 2B;

FIG. 6B is an enlarged partial view of the position sensor of FIG. 6A;

FIG. 7A is a timing chart showing an output from the position sensor shown in FIGS. 6A and 6B;

FIG. 7B is a timing chart showing a sine signal and a cosine signal, which are obtained from the output of their position sensor of FIG. 7A;

FIG. 9 is a timing chart showing a relationship between an output of the position sensor of FIG. 7B and a speed signal;

FIG. 13 is a block diagram showing an example of a track control sequence of the present invention, which is applied to the data reading device of FIG. 3;

DETAILED DESCRIPTION OF THE PREFERRED EMBODIMENTS

An embodiment of the present invention will be explained with reference to the drawings.

Figure 3:
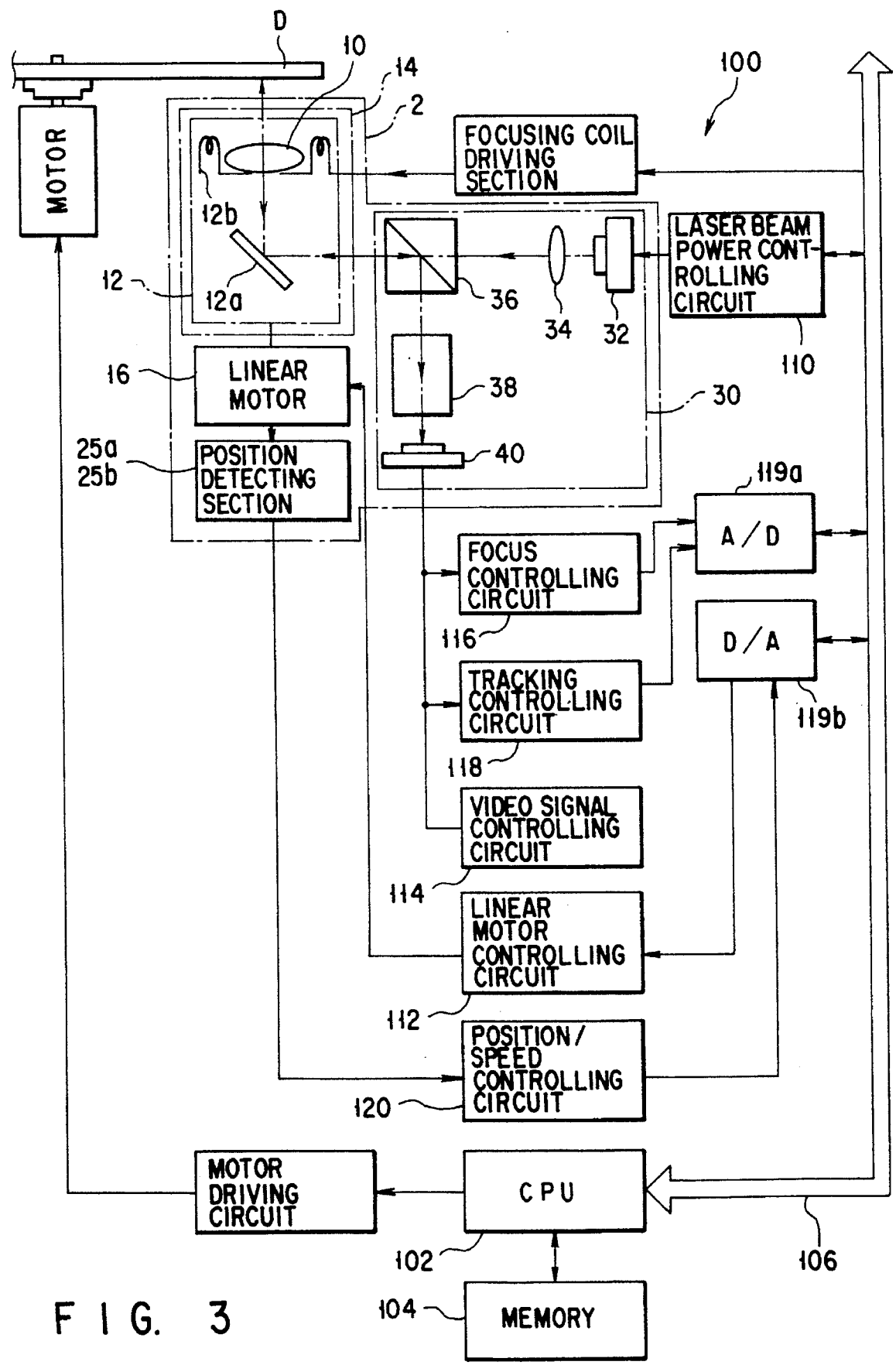
FIG. 3 is a schematic view showing one example of data reading device having the optical head of FIGS. 1, 2A and 2B.

FIG. 1 is a schematic view showing an outline of an optical head device in which a friction compensation mechanism of the present invention is used. FIGS. 2A and 2B are a plane view and a gross sectional view of the optical head device of FIG. 1, respectively. FIG. 3 is a schematic view showing a data reading device having the optical head device of FIGS. 1, 2A and 2B.

As shown in FIGS. 1, 2A and 2B, an optical head device 2 has an objective lens 10, which applies a laser beam to a recording surface of an optical disk (recording medium) D to be described later with reference to FIG. 3 from a laser unit 30 to be described later with reference to FIG. 3, and which receives the laser beam reflected by the recording surface of the optical disk D. The objective lens 10 is held by a lens actuator (holding means) 12 to be movable in a direction perpendicular to the recording surface of the optical disk D, that is, focusing direction. The lens actuator 12 is supported by a slide base 14 to be movable in a direction perpendicular to the recording surface of the optical disk and in an axial direction.

At a predetermined position of the lens actuator 12, there are provided a mirror 12a, and a focus coil 12b. The mirror 12a guides the laser beam to the objective lens 10 from the laser unit 30 (shown in FIG. 3) through an opening section (not shown). The focus coil 12b is used to move the objective lens 10 in a direction perpendicular to the recording surface of the optical disk D.

A pair of leg portions 14a and 14b are provided to be integral with a slide base 14 at predetermined positions of the slide base 14 parallel to the recording surface of the optical disk D and each of the leg portions 14a and 14b has a distance substantially equal to an optical axis of the laser beam sent from the laser unit 30 to the mirror 12a.

Drive coils 16a and 16b are provided at predetermined positions of the leg portions 14a and 14b, that is, substantially a center of the leg portions in a direction parallel to a radial direction of the optical disk D, respectively. Each of the drive coils 16a and 16b generate driving force for moving the slide base 14 in a predetermined direction in accordance with a magnetic field provided by a fixing magnet. The drive coils 16a and 16b form a linear motor 16 for linearly moving the slide base 14 by a fixed magnet and a guide shaft, respectively.

Slide members 18a and 19a, and 18b and 19b are arranged at predetermined position of the lens 14a and 14b parallel to the recording surface of the optical disk D and each of the slide members has a distance substantially equal to an optical axis of the laser beam sent from the laser unit 30 to the mirror 12a close to end portions of the slide base 14, respectively. The slide members 18a and 19a and 18b and 19b bring the leg portions 14a and 14b into contact with guide shafts to be described later by friction having a value below a predetermined coefficient of friction, respectively.

As slide members 18a and 19a, and 18b and 19b, there are used one of tubelike solid bearings, oil impregnation sinter bushes (sliders), or linear moving type bearings, each having an inner diameter defined by a predetermined tolerance to a diameter of the guide shaft. The slide members 18a and 19a, and 18b and 19b are formed at the end portions of the slide base 14 by pressure processing or simultaneous molding.

In the slide members 18a and 19a and 18b and 19b, there are provided guide shafts 20a and 20b, each having an outer diameter defined by a predetermined tolerance to an inner diameter of each of the slide members, for holding a slide base moved in a predetermined direction by propulsive force generated by a current supplied to the drive coils 16a and 16b.

Moreover, photosensors 22a and 22b are provided at a predetermined position of leg portions 14a and 14b. That is, each of the photosensors 22a and 22b is provided at a side opposite to a side where the lens actuator 12 on the slide base 14 is held, and a portion close to a position where moment to be described later is generated. The photosensors 22a and 22b are used to detect the position of the slide base 14 moving along the guide shafts 20a and 20b, that is the position of the objective lens 10.

Moreover, linear scales 24a and 24b are provided at a passage where the photosensors 22a and 22b are moved parallel to each of the guide shafts 20a and 20b and the recording surface of the optical disk, and portions close to each of the photosensors 22a and 22b. The linear scales 24a and 24b are used to show the positions of each of the photosensors 22a and 22b.

The photosensor 22a and the linear scale 24a are combined with each other, and the photosensor 22b and the linear scale 24b are combined with each other. These combinations are used as position detectors 25a and 25b for detecting the present positions of the leg portions 14a and 14b, respectively.

Furthermore, there are provided magnet generating devices, that is, fixed magnets 26a and 26b. Each of the magnets 26a and 26b is provided at surfaces including an axis of each of the guides shafts 20a and 20b, and an outside of each of the shafts 20a and 20b, that is, an outside of each of the drive coils 16a and 16b. Each of the fixed magnets 26a and 26b function to change magnetic force, which is generated by supplying the current to each of the coils 16a and 16b, to propulsive force.

Also, first and second yorks 28a and 28b are provided. Each of the yorks 28a and 28b is formed at an outside of each of the magnets 26a and 26b, and a position having at least a portion of a surface including axes of the guide shafts 20a and 20b in common. The first and second yorks 28a and 28b hold the magnets 26a and 26b, and form a magnetic circuit, which is used to efficiently supply magnetic force provided by the respective magnets to each drive coil. The yorks 28a and 28b are connected to each other through auxiliary yorks 28c and 28d to form a pair of closed circuits. The auxiliary yorks 28c and 28d are used as support frames for supporting the guide shafts 20a and 20b.

As shown in FIG. 3, the laser unit 30 provides an irradiation of laser beam to the mirror 12a of the lens holder 12 supported to be movable along the slide base 14. The laser unit 30 has a semiconductor laser 32, a collimate lens 34, and a beam splitter 36. The semiconductor laser 32 emits a laser beam having a predetermined wavelength. The collimate lens 34 is provided between the laser 32 and the mirror 12a to form the cross sectional shape of the laser beam emitted from the laser 32 to have a predetermined size. The beam splitter 36 is provided between the lens 34 and the mirror 12a to guide the laser beam passed through the lens 34, and to separate a reflected laser beam reflected by the optical disk D from a laser beam directing to the optical disk D. In the direction where the reflected laser beam, which is separated by the beam spliter 36 of the laser unit 30, is guided, there are provided a condenser lens unit 38 and a photodetector 40. The condenser lens unit 38 provides a predetermined optical characteristic to the reflected laser beam. The photodetector 40 converts the reflected laser beam to which the predetermined optical characteristic is provided by the condenser lens unit 38 to an electrical signal corresponding to light intensity of the laser beam.

As shown in FIG. 3, the optical head device of FIGS. 1, 2A, and 2B is controlled by a CPU 102, serving as a main controlling device, which is incorporated into a data reading device, that is, an optical disk device 100.

A memory 104 is connected to the CPU 102 through a bus line 106. The memory 104 stores a control program for positioning the objective lens 10 of the optical head device 2 to a predetermined position.

A laser controlling circuit 110 and a linear motor controlling circuit 112 are also connected to the CPU 102 through the bus line 106. The laser controlling circuit 110 drives the laser 32, and changes light intensity of the laser beam emitted from the laser 32 in accordance with data to be recorded. The linear motor controlling circuit 112 moves the linear motor 16 to a predetermined position.

Moreover, a video signal processor 114, a focus controlling circuit 116, and a tracking control circuit 118 are connected to the CPU 102 through the bus line 106. The video signal processor 114 processes to reproduce data recorded in the optical disk D from the reflected laser beam sent from the recording surface of the optical disk D detected by the photodetector 40. The focus controlling circuit 116 moves the objective lens 10 in order to conform a distance between the objective lens 10 and the recording surface of the optical disk D to a focal distance of the objective lens 10 based on the reflected laser beam detected by the photodetector 40 by the supply of the predetermined current to the focus coil 12b. The tracking controlling circuit 118 conforms the center of the light beam passed through the objective lens 10 to the track center of the optical disk based on the reflected laser beam detected by the photodetector 40. In this case, the focus controlling circuit 116 and the bus line 106, and the tracking controlling circuit 118 and the bus line 106 are mutually connected to each other through an A/D converter 119a and a D/A converter 119b, respectively.

Moreover, a position/speed controlling circuit 120 is connected to the CPU 102 through the bus line 106. The position/speed controlling circuit 120 controls the position of the slide base 14 and the speed at which the slide base 14 is moved, that is, the linear motor 16 based on an output of each of position detectors 25a and 25b.

FIGS. 4A to 4E show a positional relationship between the reflected laser beam passed through the condenser lens unit 38 of the laser unit 30 and the photodetector 40, and an example of an output signal outputted from the photodetector 40, respectively.

Figure 4A:
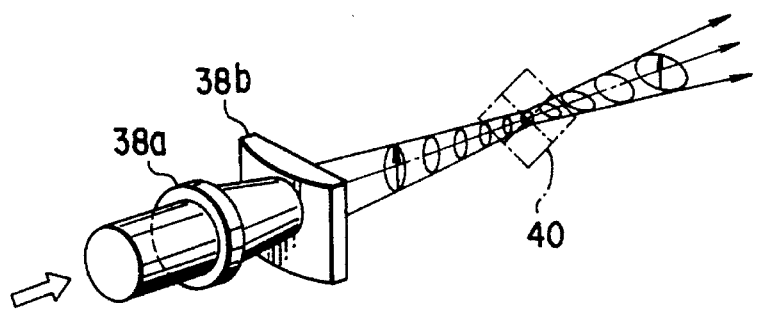
FIGS. 4A to 4E are schematic views showing a principle of a of a focal point detection of an objective lens of the data reading device shown in FIG. 3.

As shown in FIG. 4A, the condenser lens unit 38 has a condenser lens 38a and a cylindrical lens 38b. The condenser lens 38a provides a predetermined focusing property to the reflected laser beam separated through the beam spliter 36. The cylindrical lens 38b provides astigmatism to the reflected laser beam passed through the condenser lens 38a.

Therefore, the reflected laser beam passed through the cylindrical lens 38b is first focused on the first direction. Thereafter, the laser beam is focused on the second direction perpendicular to the first direction.

Figure 4B:
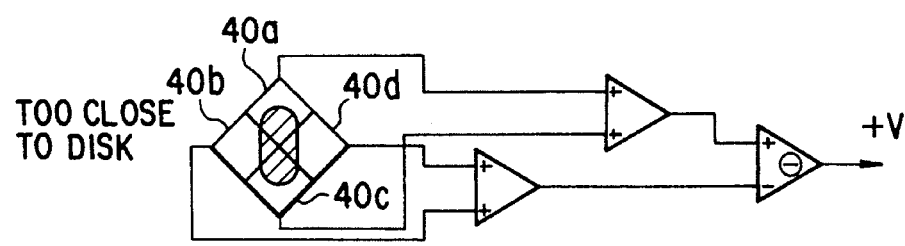
Figure 4C:
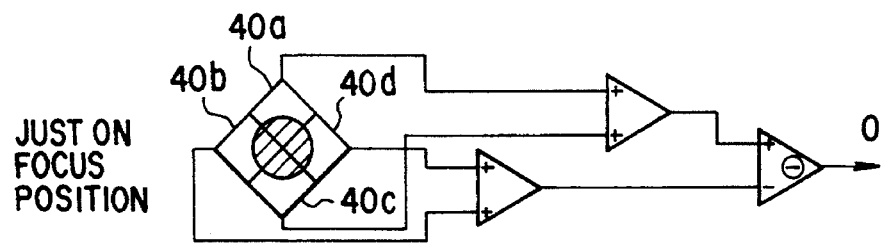
Figure 4D:
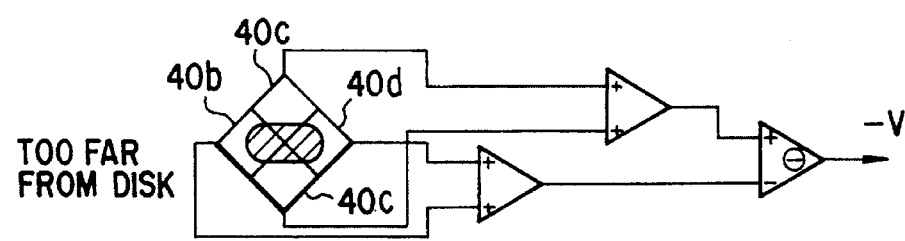
Figure 4E:
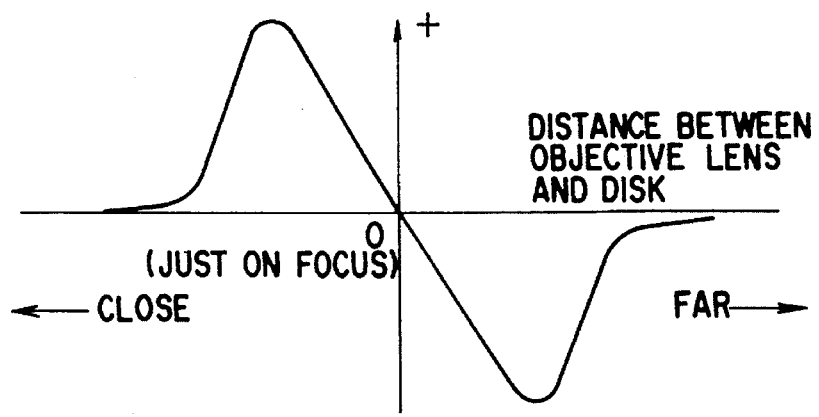

The photodetector 40 is a four-divisional photodetector having first to fourth detection areas 40a to 40d. As shown in FIG. 4B to 4D, the output of the first detection area 40a and that of the third detection areas 40c are added, and the output of the second detection area 40b and that of the fourth detection areas 40d are added. Then, a difference between the addition of the outputs of first and third areas 40a and 40c and that of the outputs of the second and fourth areas 40b and 40d is detected. Thereby, a signal having a polarity of "0" or "+", or "−" is outputted in accordance with the cross sectional shape of the reflected laser beam passed through the condenser lens unit 38. For example, a difference between the output of the first detection area 40a and that of the third detection area 40c or a difference between the output of the second detection area 40b and that of the fourth detection area 40d is calculated, so that reduction of light density, which is caused in accordance with influence of a shadow of the track, can be detected. Due to this, a shift between the center of the track and the center of the reflected laser beam passed through the objective lens 10 can be obtained.

Therefore, the focus between the objective lens 10 and the recording surface of the optical disk can be matched. In a case where the output sent from the photodetector 40 is "positive" or "negative", a predetermined drive current is supplied to the focus coil 12b by the focus controlling circuit 116, and the objective lens 10 is moved such that the output sent from the photodetector 40 becomes 0.

FIG. 5 is a schematic view explaining a direction of the current supplied to the drive coils 16a and 16b and a direction of force to be generated.

As shown in FIG. 5, the drive coils 16a and 16b are coils which are wound to be opposite to each other. These drive coils generate propulsive force, which can move the slide base 14 in the same direction in accordance with a magnetic field provided by the magnets 26a and 26b.

More specifically, if a current i, which flows in a direction an arrow a, is supplied to the drive coil 16a in a state that the drive coil 16b is a reference, propulsive force F is generated in a direction of an arrow c in accordance with Fleminhg's rule since a direction of a magnetic line of force from the magnetic 26b is an arrow Bg, that is, a direction passing through the drive coil 16b from the magnet 26b.

On the other hand, as already explained, since the drive coil 16a is wound to be opposite to the coil 16b, the current i flows in a direction opposite to the coil 16b. Since the magnetic line of force is provided to the coil 16a in a direction passing through the drive coil 16a from the magnet 26a, propulsive force F is directed to the direction of the arrow c.

In contrast, if the current is supplied to the drive coil 16b in a direction of the arrow b, propulsive force F is defined in the direction of an arrow d. Therefore, it is needless to say that the slide base 14 is moved in the direction of an arrow f of FIG. 1.

The following will explain the feature of the operation of the optical head device 2 shown in FIGS. 1 to 5.

The laser beam sent from the semiconductor laser 32 of the laser unit 30 is passed through the collimate lens 34 and the beam splitter 36 in order. Thereafter, the laser beam is bent at about 90° through the mirror 12a to be guided to the objective lens 10 and focused on the recording surface of the optical disk D.

The reflected laser beam reflected by the recording surface of the optical disk D is returned to the objective lens 10. Thereafter, the laser beam is returned to the beam splitter 36 by the mirror 12a. Then, the laser beam is separated from the light beam directing to the optical disk from the laser 32 through the beam splitter 36, passed through the condenser lens 38a of the condenser lens unit 38, and the cylindrical lens 38b in order, and image-formed to the photodetector 40.

The outputs of the receptive detection areas 40a to 40d of the photodetector 40 are supplied to the focus controlling circuit 116, the tracking control circuit 118, and the video signal controlling circuit 114.

Also, it is needless to say that an amount of compensation calculated by the tracking controlling circuit 118 is superimposed on a motor controlling supplied to the linear motor 16 from the linear motor controlling circuit 112.

Therefore, the objective lens 10 is focus-locked on the recording surface of the optical disk by the focus control signal to the focus coil 12b from the focus controlling circuit 16. Sequentially, the tracking is matched by the movement of the linear motor 16 by the linear motor control signal on which the tracking signal sent from the tracking control circuit 118 is superimposed.

Thereafter, a sum signal of the outputs of the respective detection areas 40a to 40d of the photodetector 40 is supplied to the video signal controlling circuit 114 to be reproduced as a video signal.

According to FIGS. 6A, 6B, 7A, 7B, 8A, 8B, 9, 10 and 11, the present position of the slide base 14 moved based on propulsive force F from the drive coils 16a and 16b shown by FIG. 5 are measured every leg portions by the photosensor 22a and the linear scale 24a, and the photosensor 22b and the linear scale 24b.

More specifically, as shown in FIG. 6A, the photosensor 22a (typically shown in this case) is a photo-interrupter having four-divisional photodiode 22-1, a shielding mask 22-2, and a light-emitting diode 22-3. The four-divisional photodiode 22-1 is formed such that the detecting surface is divided to four. The shielding mask 22-2 is provided on the detecting surface of the photodiode 22-1. The light-emitting diode 22-3 is a light source for irradiating light to the detecting surface. The linear scale 24a (typically shown in this case) is positioned between the shielding mask 22-2 and the light-emitting diode 22-3, and fixed to the guide shaft 20a or a structure (not shown), or either auxiliary york 28c or auxiliary york 28d.

As shown in FIG. 6B, the shielding mask 22-2 has four slits p, q, r and s which are defined to correspond to four detecting surfaces g, h, j and k of the four-divisional photodiode 22-1. Each of the slits p, q, r and s has a width of 0.5 mm. Then, the slits p and q and the slits r and s are paired to have a distance of 1 mm, respectively. The pair of slits p, q and the pair of slits r, s are provided to have a distance of 0.25 mm. Moreover, the linear scale 24 is a shielding screen in which an opening section having a width of 0.5 mm is formed by a pitch of 1 mm. The shielding screen projects light sent from the light-emitting diode 22-3 onto the shielding mask 22-2.

The following will explain a method for detecting the position of the slide base 14 by the position detecting mechanism (position detectors 25a and 25b) shown by FIGS. 6A and 6B with reference to FIGS. 7A, 7B, 8A, 8B, and 9.

As shown in FIG. 7A, light, which is emitted from the light-emitting diode 22-3, passed through the shielding mask 22-2, and reaches each of the detecting surface of the four-divisional photodiode 22-1, is photoelectrically transferred through the respective detecting surfaces g, h, j, and k. Thereafter, the light beam is converted to the position signal showing the present position of the objective lens 10 and the speed signal showing the moving speed of the objective lens 10 by the position/speed detecting circuit 120.

More specifically, when the shielding mask 22-2 and the linear scale 24 are conformed to each other as in the state shown in FIG. 6B, the output of the detecting surface h becomes "1." Therefore, the output of the detecting surface g becomes "0." In other words, it can be displayed that the phase difference between the output of the detecting surface h and that of the detecting surface g is 180°.

Similarly, the output of each of the detecting surfaces j and k is "0.5." Under the condition that the output of the detecting surface h is a reference, it can be displayed that the phase difference between the output of the detecting surface h and that of the detecting surface j is 90°. Moreover, it can be displayed that the phase difference between the output of the detecting surface h and that of the detecting surface k is −90°.

FIG. 7B shows a state that an output obtained by the calculation of "output of the detecting surface g—that of the detecting surface h" and an output obtained by the calculation of "output of the detecting surface j—that of the detecting surface k" are synthesized with each other. The phase difference between two signals shown in FIG. 7B becomes 90°.

For convenience, the output obtained by the calculation of "output of the detecting surface g—that of the detecting surface h" is defined as a sine wave and the output obtained by the calculation of "output of the detecting surface j—that of the detecting surface k" is defined as a cos wave.

Figure 8A:
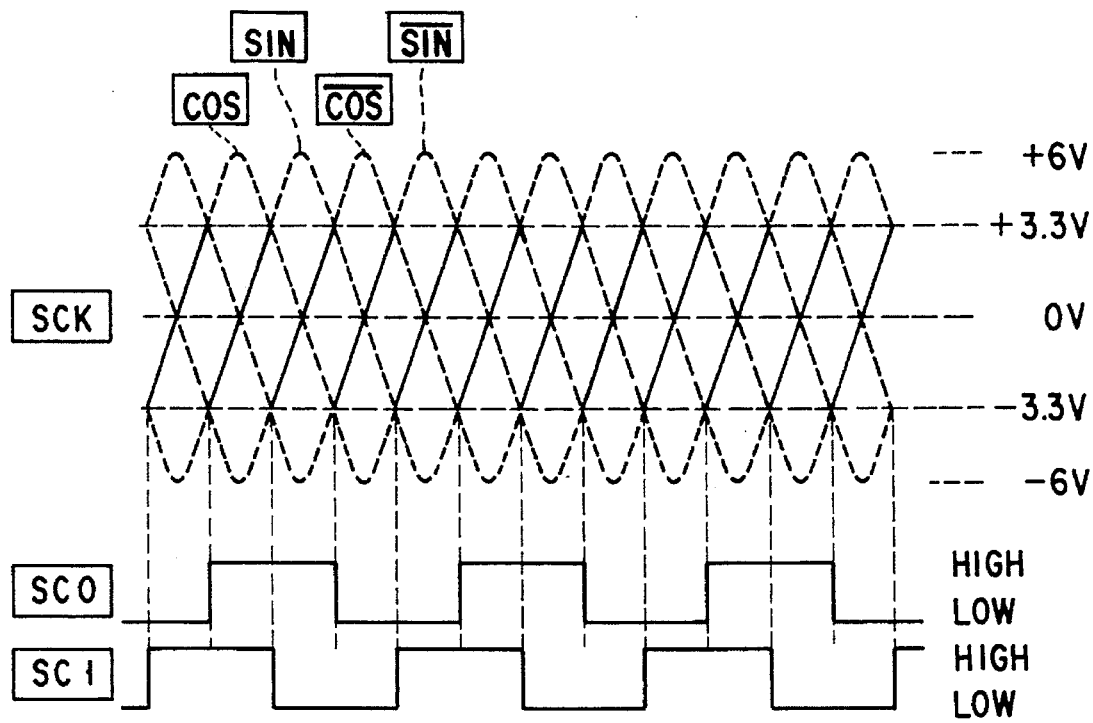
FIG. 8A is a timing chart showing a relationship between the output of the position sensor of FIG. 7B and a position signal generated by a position/speed detecting circuit.

As shown in FIG. 8A, a position signal (scale signal) SCK showing the position of the objective lens 10 is generated by the output signal inputted to the position/speed detecting circuit 120 from each of the position detectors 25a and 25b.

The position signal SCK can be easily obtained by synthesizing the sine wave SIN and the cosine COS wave shown in FIG. 7B by a multiplexer (not shown). If the voltage between the maximum length of the sine wave and the minimum length of the sine wave SIN, and the voltage between the maximum length of the cosine wave COS and the minimum length of sine wave are 12 volts (peak to peak), respectively, the position signal SCK becomes 3.8 volts (peak to peak). In this case, the position signal SCK becomes 38 μ/volt.

Figure 8B:
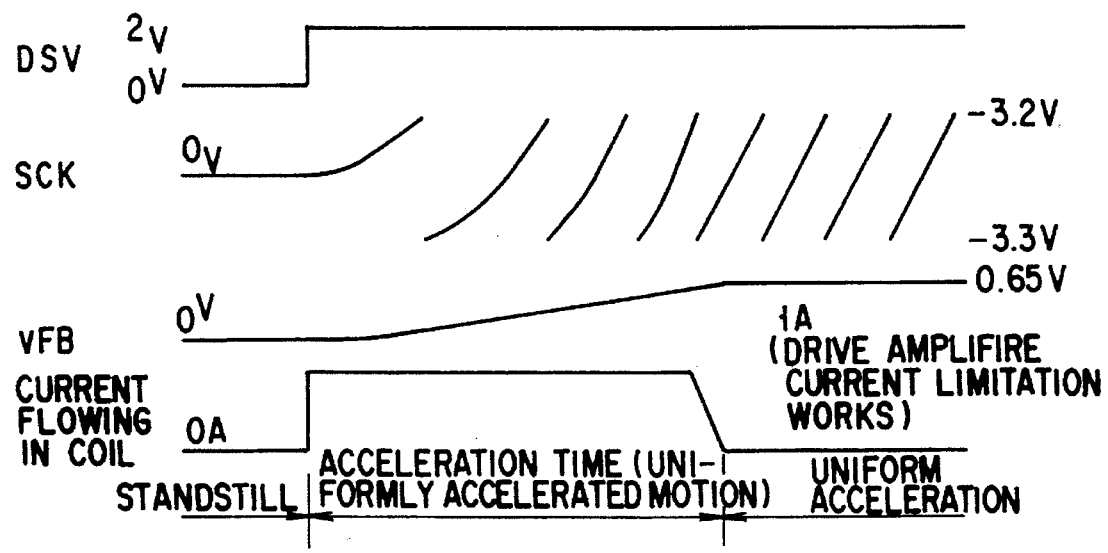
FIG. 8B is a timing chart showing a relationship between the position signal of FIG. 7B and a moving speed of the objective lens (optical head device) of FIG. 2B.

FIG. 8B is a graph showing the relationship between the position signal SCK and the speed of the linear motor 16. From FIG. 8B, it can be understood that an inclination of the position signal SCK is lenient until the speed of the linear motor 16 becomes uniform, and no inclination occurs in a stop state.

FIG. 9 is a graph showing the speed of the linear motor obtained by differentiating either the sine wave or the cosine wave shown in FIG. 7B.

If the speed of the linear motor 16 is 100 mm/sec., an output having 100 pulses per second can be obtained. Therefore, an actual speed of the linear motor 16 can be easily obtained by obtaining time per pulse. As shown in FIG. 7B, if the voltage between the maximum length of the sine wave and the minimum length of the sine wave, and the voltage between the maximum length of the cosine wave and the minimum length of sine wave are 12 volts (peak to peak), respectively, the moving speed is 100 mm/sec, in a case where the output signal is 2.4 volt/mm sec.

Figure 10:
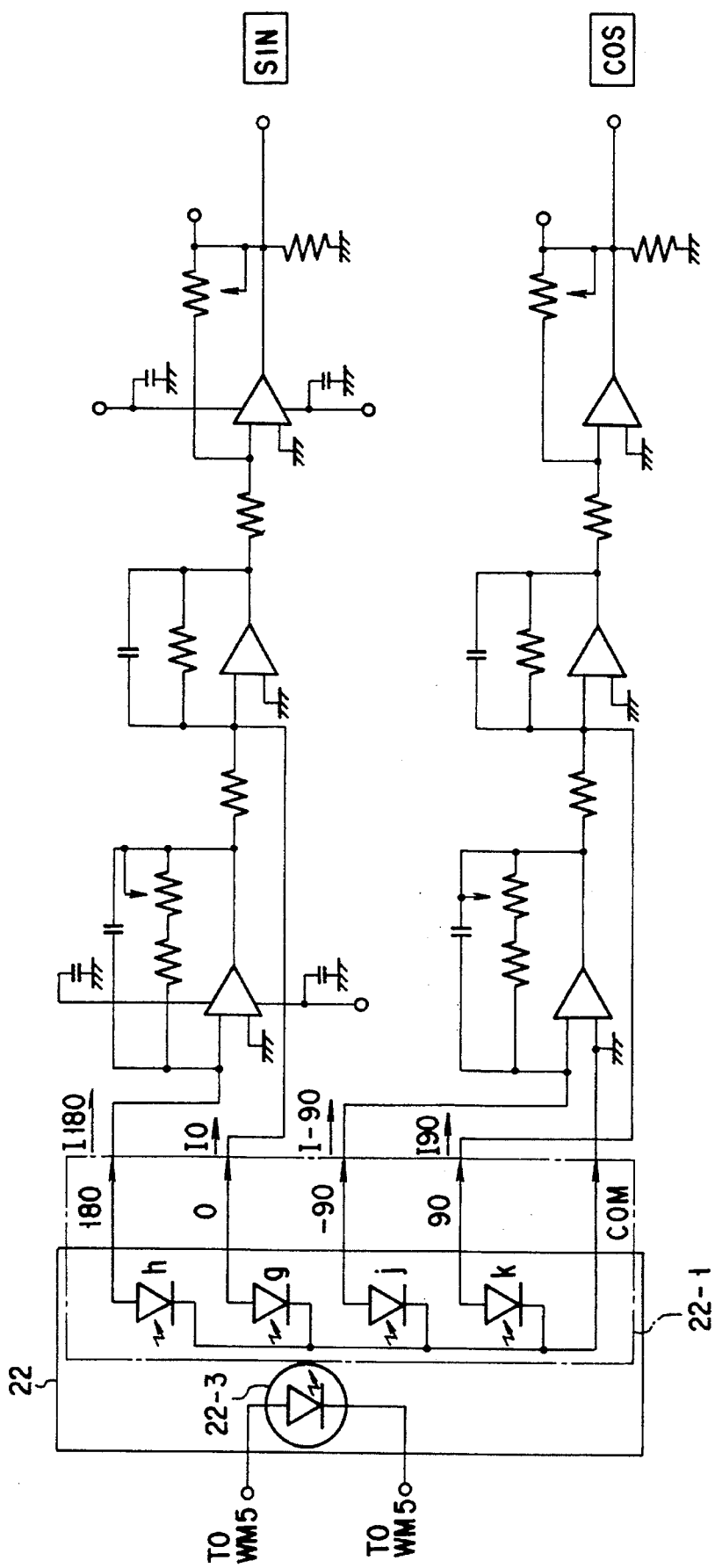
FIG. 10 is a circuit diagram showing one example of a position detecting circuit for generating the position signal of FIG. 8A.
Figure 11:
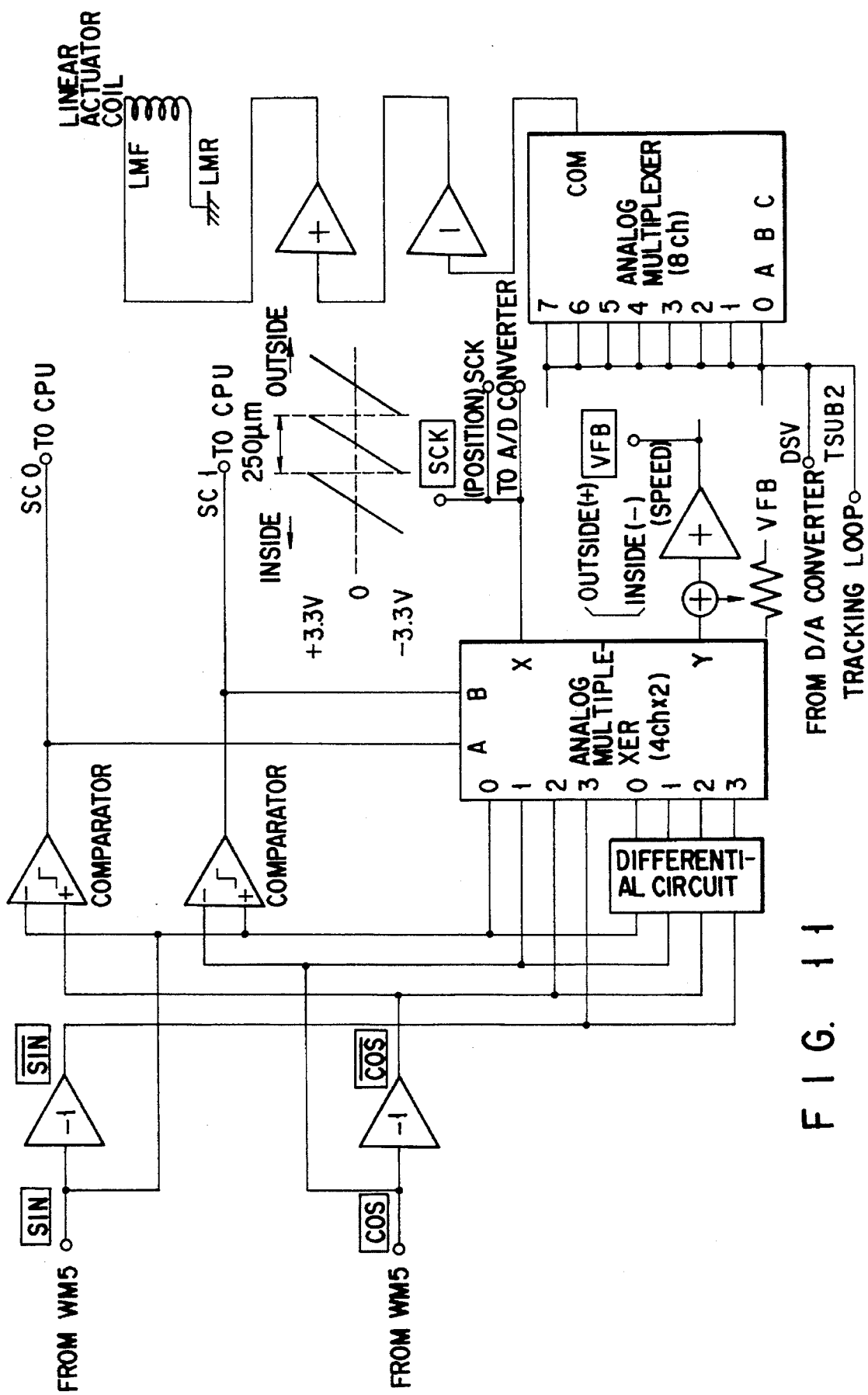
FIG. 11 is a circuit diagram showing an example of a speed detecting circuit for generating the speed signal of FIG. 9.

FIGS. 10 and 11 are circuit diagrams showing an electrical circuit showing one example of a processing circuit which is suitable for the position detection and the speed detection shown in FIGS. 7A, 7B, 8A, 8B and 9.

In the lens actuator 12 of the optical disk device 100 shown in FIGS. 1, 2A, 2B, and 3, the tracking coil (or tracking mechanism), which is provided in the conventional optical head device, is removed. In other words, the drive coils 16a and 16b of the linear motor 16 have all of a rough access, a uniform access, and a tracking (track jump).

The following will explain the controlling of the linear motor 16, which can carry out all of the rough access, the uniform access and the tracking jump.

Figure 12:
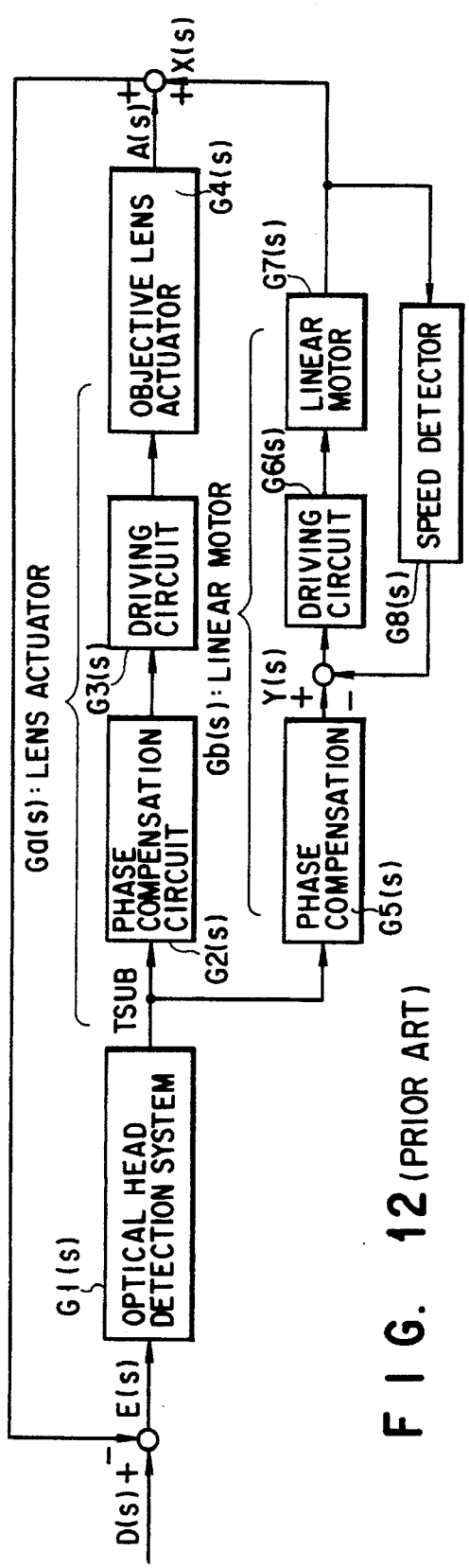
FIG. 12 is a block diagram showing an example of a track control sequence, which is used in a data reading device (prior art)

FIG. 12 shows one example of sequence of the track controlling of the conventional optical head device.

According to FIG. 12, in the conventional optical head device, the tracking coil, which is provided in the vicinity of the objective lens, and the objective lens, that is, linear motor, which carries out the rough access of the lens actuator and the uniform access of the lens actuator, are controlled as an independent system, by a double loop.

The specific explanation of the track control (tracking and access) of the conventional optical head device is omitted since it is already explained in the item of the prior art. In this, each of G1(s) to G8(s) shows the well known transfer function. More specifically, G1(s) is an optical head detection system, G2(s): phase compensation circuit, G3(s): driving circuit, G4(s): objective lens actuator, G5(s): phase compensation, G6(s): driving circuit, G7(s): linear motor, and G8(s): a speed detector.

FIG. 13 is a block diagram showing one example of the control sequence of the linear motor of the embodiment of the present invention.

As shown in FIG. 13, in the linear motor, a tracking error component, that is, displacement of the track caused by eccentricity of the optical disk D is detected by a detection system G11(s). The detected displacement is amplified by an amplifier G12(s). Then, an amount of compensation for compensating the position of the lens actuator 12 (objective lens 10) is obtained in accordance with the displacement by a compensation circuit G13(s). Sequentially, a current value to be supplied to the drive coils 16a and 16b is obtained by a drive current setting circuit G14(s), and a predetermined driving force is supplied to the drive coils 16a and 16b by a drive circuit 15G(s). Thereby, the lens actuator 12 (objective lens 10), that is, slide base 14 is moved in a predetermined direction by an actual operation G16(s), and an amount of movement of the slide base 14, that is, the present position can be detected by a detector G17(s). In this case, it is needless to say that the speed at which the slide base 14 is moved, that is, the moving speed of the linear motor 16 is detected by a speed detector G18(s) to be fed back to the front stage of the drive current setting circuit G14(s). It is noted that transfer functions G11(s) to G18(s) of FIG. 13 are substantially the same as transfer functions G1(s) to GS(s) of FIG. 12.

In the sequence of FIG. 13, if the slide base 14 moved by the actual operation G16(s) does not reach a target track, a tracking error or a step out of track is generated.

In order not to generate the tracking error or the step out of track, all factors in causing that the slide base 14 moved by the actual operation G16(s) does not reach the target track are regarded as disturbance. Then, regarding the amount of movement of the slide base 14 changed based on disturbance, an amount of change is estimated by a disturbance estimation observer circuit G19(s) to compensate for the drive current to be supplied to the drive coils 16a and 16b. In this case, an amount of compensation obtained by the disturbance estimating observer circuit G19(s) is fed back to the front stage of the drive current setting circuit G14(s) as a disturbance canceling signal.

Figure 14A:
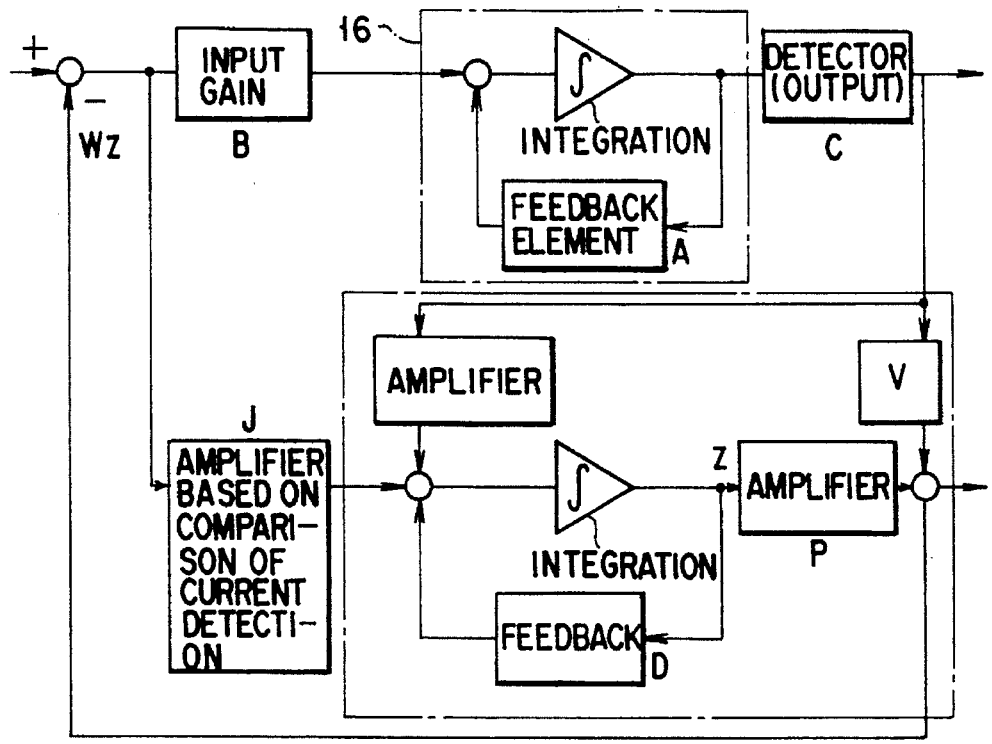
FIG. 14A is a block diagram showing one example of an observer circuit, which is used to attain the track control sequence of FIG. 13, by a vector.
Figure 14B:
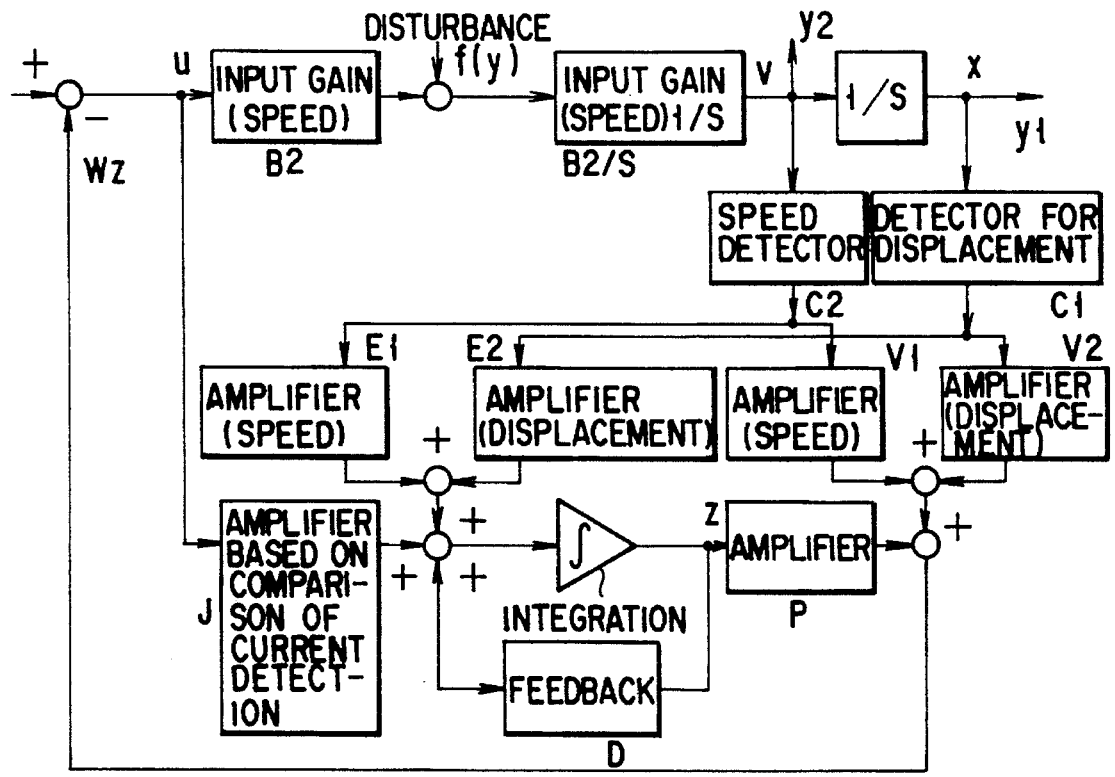
FIG. 14B is a block diagram showing the observer circuit of FIG. 14A as a scalar.

FIGS. 14A and 14B are block diagrams showing one example of the disturbance estimating observer circuit for estimating the amount of change as disturbance.

FIG. 14A shows one example of the disturbance estimation observer circuit by a vector, and FIG. 14B is a view in which the vector shown in FIG. 14A is divided every component, and shown by a scalar. In FIG. 14A, A is a feedback element, B: input gain, C: detector, D: feedback detector, E: amplifier, J: amplifier used based on the comparison of the current detection, P: amplifier, and V: amplifier. In FIG. 14B, B2: input gain, C1: detector for displacement, C2: speed detector, D: feedback element, E1, E2: amplifier, J: amplifier used based on the caparison of the current detection, P: amplifier, V1, V2: amplifier.

As disturbance factors, which influence on the movement of the linear motor 16, there can be considered weight of the slide base 14 including the lens actuator 12 mounted on the linear motor 16, a bending characteristic of a wire harness member (not shown) such as a signal line extended from the slide base 14 and a power line (not shown) for the focus coil 12b, a tension resistance of the wire harness member generated by the movement of the slide base 14, and friction between the solid bearings 18a, 19a, and the guide shafts 20a and 20b and friction between the solid bearings 18b, 19b and the guide shafts 20a and 20b.

The following will explain the friction between the solid bearings 18a, 18b, 19a and 19b and the guides shafts, which is the most influential disturbance factor.

Generally, kinetic friction is generated between the solid bearings or oil impregnation sintering bushes, or linear moving type bearings 18a and 19a, and 18b and 19b and the guide rails 20a and 20b, respectively. There has been known that the intensity of kinetic friction, that is, frictional force is a reverse polarity against force to the moving speed, and is increased in proportional to the moving speed.

The frictional force is lower than electromagnetic force in regularity. In many cases, particularly in the low frequency area, though periodicity is recognized, there has been known that a discontinuous operation different from the sine wave is shown.

Therefore, the level of the drive current supplied to the drive coils 16a and 16b of the linear motor 16, the position (displacement) where the linear motor 16 is moved, and the moving speed of the linear motor 16 are measured to obtain an equation of state of frictional force. Then, the displacement of the linear motor 16 due to frictional force is compensated by the disturbance estimating observer circuit, so that tracking can be executed by only the linear motor 16.

The following will explain the equation of state showing frictional force in which frictional force is modeled under a condition that frictional force between the guide shafts and the bearing is proportional to the periodical change of speed in a fixed range of time in the access and tracking.

If frictional force f is expanded by the moving speed v based on Taylor's expansion, frictional force f can be expressed by the following equation (1):

$$f = fo - \frac{df}{dv} \cdot dv + \frac{d^2f}{dv^2} \cdot dv^2 + \ldots + c \tag{1}$$

wherein c shows disturbance, which can not be included as frictional force.

Then, if equation (1) is differentiated by time t and a result is arranged based on linear terms, the following equation (2) can be obtained:

$$\frac{df}{dt} = -\frac{df}{dv} \cdot \frac{dv}{dt} + c = -\frac{df}{dv} \cdot \frac{d^2x}{dt^2} + c \tag{2}$$

wherein t: time, and x: displacement of the movable section.

Then, if the weight of the movable section is m and force applied to the movable section, that is, driving force is F, the equation (2) can be rewritten to the following equation (3):

$$\frac{d^2x}{dt^2} + c = \frac{(F+f)}{m} + c \tag{3}$$

Therefore, the equation (2) can be deformed to the following equation (4):

$$\frac{df}{dt} = -\frac{df}{dv} \cdot \frac{(F+f)}{m} \tag{4}$$

$$= -\frac{df}{dv} \cdot \frac{f}{m} - \frac{df}{dv} \cdot \frac{F}{m}$$

From the equation (3), an equation of motion of the system having no restoration such as the linear motor can be shown by the following equation (5):

$$m \cdot \frac{d^2x}{dt^2} = F + f \tag{5}$$

On the other hand, an equation showing domination by disturbance can be expressed by the following equation (6) from the equation (4):

$$\frac{df}{dt} = (\Gamma \cdot f + \Gamma \cdot F)/m \tag{6}$$

If $f/m$ is $\eta$ and $-(df/dv)/m$ is $\gamma$ under a condition of $v=dx/dt$, the equation (6) can be rewritten to the following equation (7):

$$\frac{d\eta}{dt} = \Gamma \cdot \eta + \frac{\Gamma}{m} \cdot F \tag{7}$$

Also, providing magnetic flux density crossing the drive coil is Bg, a length of a thrust generating section per one turn of the drive coil is L, a number of turns of the drive coil is n, and the level of the driving current supplied to the drive coil is i, the driving force F can be expressed by the following equation (8):

$$F = Bg \cdot L \cdot n \cdot i \tag{8}$$

Then, if the displacement x of the moving section is x1, speed $v=dx/dt$ is x2, and disturbance/weight$=\eta$ is x3, and equations (5) to (7) are expressed by the equation of state, respectively, the following equations (9)-1, (9)-2, and (9)-3 can be obtained:

$$\frac{dx_1}{dt} = X_2 \tag{9-1}$$

$$\frac{dx_2}{dt} = X_3 + B_2 \cdot u \tag{9-2}$$

$$\frac{dx_3}{dt} = \Gamma X_3 + B_3 \cdot u \tag{9-3}$$

wherein $B_2 = Bg \cdot L \cdot n/m$, $B_3 = \Gamma \cdot B_2$.

If the equation of state is shown by the vector, the following equation (10) can be established:

$$\frac{dxx}{dt} = Axx + Bu \tag{10}$$

In equation (10), components of xx and u are (x1 x2 x3)=(x v $\eta$), and u=i, respectively, and a matrix A of constant number and a matrix B of constant number can be expressed by the following equation (11):

$$A = \begin{vmatrix} 0 & 1 & 0 \\ 0 & 0 & 1 \\ 0 & 0 & \Gamma \end{vmatrix}, B = (B_1 \, B_2 \, B_3)^t \tag{11}$$

The contents of the matrixes A and B of constant number can be shown by the following equations (12), (13)-1, and (13)-2, and (13)-3:

$$\Gamma = -\frac{df}{dt}/m \tag{12}$$

$$B_2 = Bg \cdot L \cdot n/m \tag{13-2}$$

$$B_3 = \Gamma \cdot B_2 \tag{13-3}$$

Figure 15:
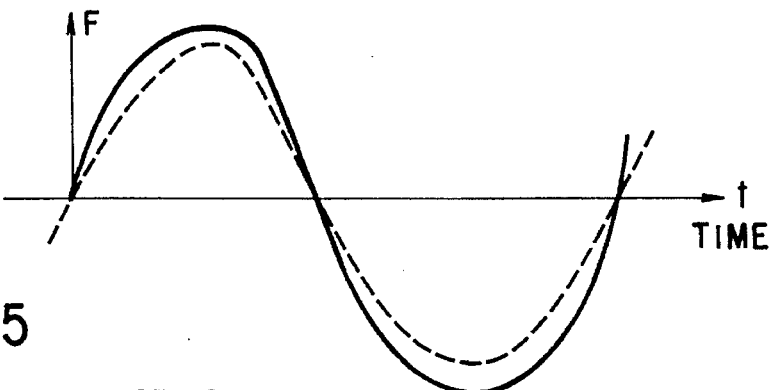
FIG. 15 is a graph showing an example of compensation of a drive current supplied to the drive coils of FIG. 5 so as to attain the track control sequence of the present invention shown in FIG. 13.

If the driving current to be supplied to the drive coils from the disturbance estimating observer circuit is obtained based on the above-obtained equation of state, it is recognized that the displacement of the present position of the linear motor caused by disturbance can be canceled by supplying the amount of current shown by a solid line of FIG. 15. For comparison, in the amount of current shown by the broken line of FIG. 15, the output of the disturbance estimating observer circuit, that is, the amount of compensation is removed.

Therefore, an area between the solid line of FIG. 15 and the broken line becomes the amount of compensation of current.

Due to this, the compensation driving current for generating driving force corresponding to driving force lost by friction is supplied to the driving coil in advance, so that the target track displaced by eccentricity of the optical disk can be tracked well.

Figure 16:
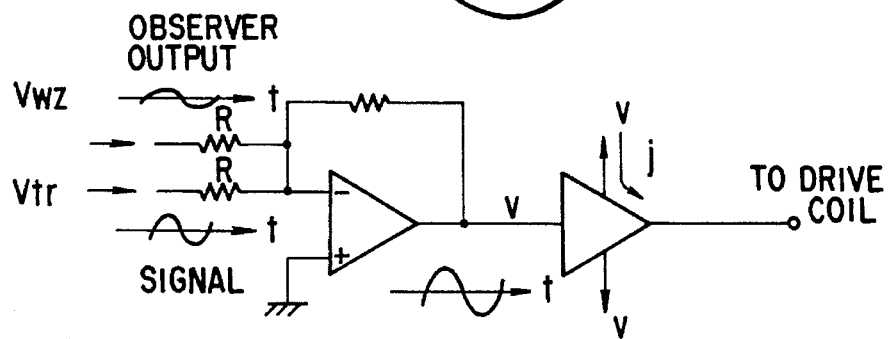
FIG. 16 is a circuit diagram showing one example of a current control circuit (friction cancel circuit), which is used to compensate for the drive current of FIG. 15.

FIG. 16 is a circuit diagram showing a preferable example of a friction canceling circuit used to provide the amount of compensation (current to be supplied to the driving coil) shown in FIG. 15. The friction canceling circuit is positioned at the front stage of the drive current setting circuit shown by G14(s) of FIG. 13.

Figure 17:
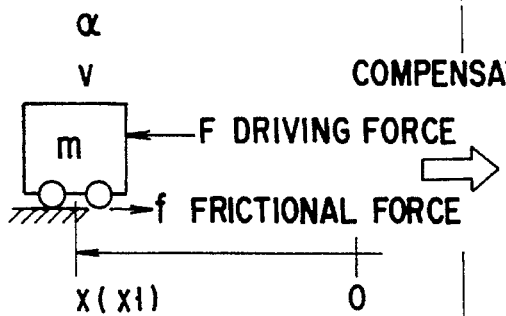
FIG. 17 is a schematic view showing an operation model of a slide base and an equation of motion of the slide base based on the compensation of the drive current of FIG. 15.
Figure 17:
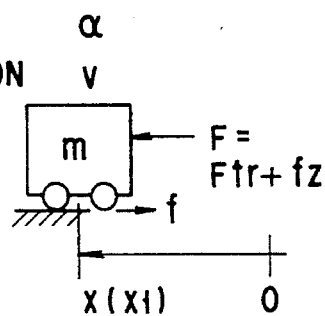

FIG. 17 shows a model showing a state of the linear motor using the friction compensation shown in FIG. 15.

As shown in FIG. 17, the friction term "f" is erased from the equation of motion by compensating for friction.

Figure 18:
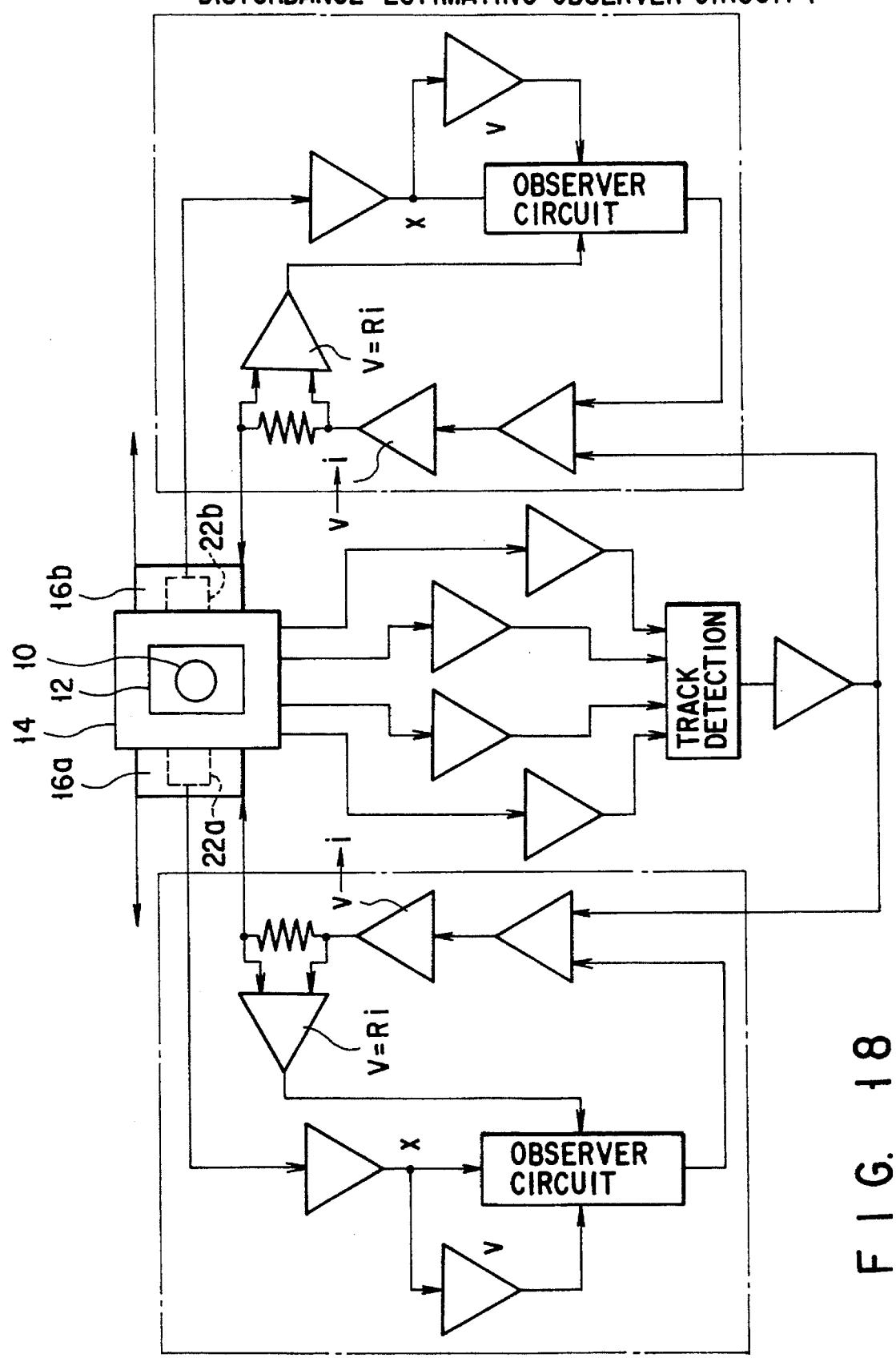
FIG. 18 is a block diagram showing an example of compensation in which friction compensation by the friction cancel circuit of FIG. 16.

FIG. 18 is a schematic block diagram of the friction canceling section including the friction canceling circuit of FIG. 16. FIG. 18 shows the state in which the sequence shown in FIG. 14A is extended to be applied to two drive coils 16a nd 16b.

As shown in FIG. 18, the friction canceling section includes the position detecting section, the disturbance estimating observer circuit, a friction component detecting section, the friction canceling circuit, and a drive coil driving circuit (current supply circuit). In accordance with the already explained friction compensation routine shown in FIG. 13, the slide base 14, that is, the lens actuator 12 is moved to the target track by the drive coils 16a and 16b.

The following will specifically explain the principle of the disturbance estimating observer circuit of FIG. 14B.

Figure 19:
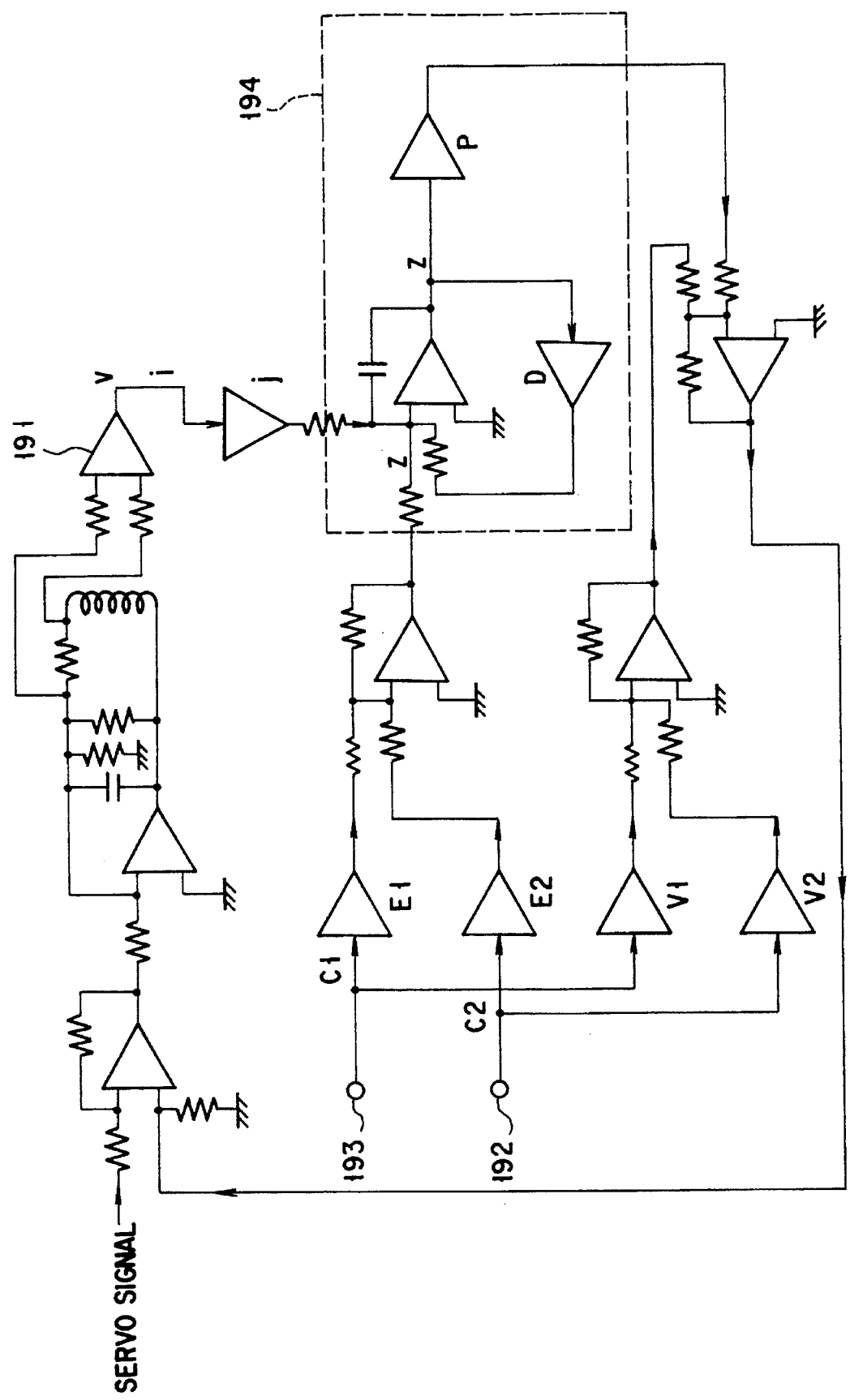
FIG. 19 is a circuit diagram showing an example of a circuit, which is suitable for a disturbance estimation observer circuit used as a compensating section for attaining friction compensation of FIG. 18.

FIG. 19 is a circuit diagram showing a preferable example of a circuit functioning as the disturbance estimating observer circuit explained by use of the scalar.

In the disturbance estimating observer circuit of FIG. 19, a coil driving current flowing in each of the drive coils 16a and 16b of the linear motor is measured by a current measuring amplifier 191. The present position and the moving speed of the slide base (objective lens 10), which are obtained by the position/speed detecting circuit 120 based on the output of the position detectors 25a and 25b, are inputted to a displacement input terminal 192 and a speed input terminal 193, respectively.

The level of the driving current calculated by the current measuring amplifier 191, and the present position and the speed inputted to the the displacement input terminal 192 and the speed input terminal 193 are inputted to an observer circuit (integrator) 194. Then, a sum of the detected value of the displacement and that of the driving current, a sum of the detected value of the speed and that of the driving current are obtained, and integrated, respectively. Then, the detected value of the displacement and that of the speed are added to a value obtained by the integration.

If the operation of the observer circuit 194 is explained by use of the equation of state again, the equation of the system can be deformed to the following equation (14) from the above-explained equation (10):

$$\frac{dx}{dt} = Ax + Bu, \quad y = Cx \tag{14}$$

Under the condition of the equation (14), the following equations (15) and (16) can be obtained:

$$\frac{dz}{dt} = Dz + Ey + Ju \tag{15}$$

$$w = Pz + Vy \tag{16}$$

The above equations (15) and (16) can be established in a case where conditions of the following equations (17)-1, (17)-2, and (17)-3 are satisfied:

$$DT+EC=TA \qquad (17)\text{-}1$$

$$J=TB \qquad (17)\text{-}2$$

$$PT+VC=K \qquad (17)\text{-}3$$

Then, the operation of the observer circuit 194 will be reviewed based on the equations (10) to (17)-1, (17)-2, and (17)-3.

If $dz/dt - Tdx/dt$ is obtained from the equations (10) and (15), the following equation (18) can be established:

$$\begin{aligned} \frac{dz}{dt} - T\frac{dx}{dt} &= D \cdot z + E \cdot y + J \cdot u - T(Ax+Bu) \qquad (18)\\ &= Dz + ECx + Ju - TAx - TBu \\ &= Dz + (EC-TA)x + (J-TB)u \\ &= Dz - DTx, \ (TA-DT=EC) \\ &= Dx(z-Tx), \ (J-TB) \end{aligned}$$

If D is a stable matrix (real number section of characteristic value of D is negative) in equation (18), an observer circuit constant z is converged to Tx and friction w is converged to Kx, so that the following equation (19) can be obtained:

If $t \to \infty$, $z \to Tx$. Therefore, $w = P \cdot z + Vy$ becomes as follows:

$$\begin{aligned} w \to PTx + VCx &= (PT+VC)x \qquad (19)\\ &= Kx \ (PT+VC=K) \end{aligned}$$

The following will specifically explain a method for estimating friction under a condition that disturbance is added to the displacement, speed, and the driving current supplied to the drive coils obtained by the observer circuit.

The disturbance estimating observer circuit deals with the speed, displacement, and disturbance as state variables, and domination of force of disturbance is added to the state of equation of the system obtained by the observer circuit, and an obtained result is extended.

More specifically, the disturbance estimating observer circuit converges the detected value of each of the speed, the displacement, and the driving current to a model of the target value in which the detected value of each of the speed, displacement, and the driving current is proportional to a periodical variation of friction generated by the tracking operation.

The following will explain a method in which a measuring signal Cyy is obtained from a state variable xx (displacement, that is, present position, speed, and disturbance), and a feedback component Dz of a state variable (amended value) z of the observer circuit is integrated to obtain the amended value z.

The equation (15) is deformed as shown in equation (21).

More specifically, the following equation (21) can be obtained under a condition that the following equations (20)-1, (20)-2, (20)-3, and (20)-4 are satisfied from the driving current i supplied to the drive coils 16a an 16b increased by J times and yy times E and an integration value of the feedback component Dz of the state variable of the observer circuit:

$$\begin{aligned} D &= (d) & (D \in R^1) & \qquad (20)\text{-}1\\ E &= (E_1 \ E_2) & (E \in R^{1 \times 2}) & \qquad (20)\text{-}2\\ J &= (j) & (J \in R^1) & \qquad (20)\text{-}3\\ z &= (z) & (z \in R^1) & \qquad (20)\text{-}4 \end{aligned}$$

A result obtained by the equation (21) is increased by p times (magnification), and yy of V times (magnification) is added thereto, thereby obtaining the output w of the observer circuit:

$$\begin{aligned} \frac{dz}{dt} &= d \cdot z + (E_1 \ E_2) \cdot (y_1 \ y_2)^t + j \cdot u \qquad (21)\\ &= d \cdot z + E_1 \cdot y_1 + E_2 \cdot y_2 + j \cdot u \\ &= d \cdot z + E_1 \cdot C_1 \cdot x_1 + E_2 \cdot C_2 \cdot x_2 + j \cdot u \end{aligned}$$

In other words, the output w of the observer circuit can be obtained by solving the equation (19) under a condition of the following equations (22)-1 and (22)-2:

$$P=(p), \ (p \in R^1) \qquad (22)\text{-}1$$

$$V=(V_1 \ V_2), \ (V \in R^{1 \times 2}), \ (P \in R^1) \qquad (22)\text{-}2$$

Therefore, the equation (19) can be deformed to the following equation (23):

$$\begin{aligned} w &= pz + (V_1 \ V_2) \cdot (y_1 \ y_2)^t \qquad (23)\\ &= pz + V_1 \cdot y_1 + V_2 \cdot y_2 \\ &= pz + V_1 \cdot C_1 \cdot x_1 + V_2 \cdot C_2 \cdot x_2 \end{aligned}$$

The equation (23) can be satisfied under a condition of the equation (17).

Then, if the conditions shown by the following equations (24)-1 to (24)-4 are applied to various variables above mentioned:

$$\begin{aligned} E &= (E_1 \ E_2) & (E \in R^{1 \times 2}) & \qquad (24)\text{-}1\\ V &= (V_1 \ V_2) & (V \in R^{1 \times 2}) & \qquad (24)\text{-}2\\ K &= (K_1 \ K_2 \ K_3) & (K \in R^{1 \times 3}) & \qquad (24)\text{-}3\\ T &= (T_1 \ T_2 \ T_3) & (T \in T^{1 \times 3}) & \qquad (24)\text{-}4 \end{aligned}$$

The condition of the equation (17)-1 can be expressed by the following equation (25):

$$d(T_1 \ T_2 \ T_3) + (E_1 \ E_2) \begin{vmatrix} C_1 & 0 & 0 \\ 0 & C_2 & 0 \end{vmatrix} = (T_1 \ T_2 \ T_3) \begin{vmatrix} 0 & 1 & 0 \\ 0 & 0 & 1 \\ 0 & 0 & \Gamma \end{vmatrix} \qquad (25)$$

The equation (25) can be rewritten every component as shown in the following equations (26)-1 to (26)-3:

$$dT_1 + E_1 \cdot C_1 = 0 \qquad (26)\text{-}1$$

$$dT_2 + E_2 \cdot C_2 = T_1 \qquad (26)\text{-}2$$

$$dT_3 + 0 = T_2 + \Gamma T_3 \qquad (26)\text{-}3$$

Similarly, the condition of the equation (17)-2 can be expressed by the following equation (27):

$$p(T_1 \ T_2 \ T_3) + (V_1 \ V_2) \begin{vmatrix} C_1 & 0 & 0 \\ 0 & C_2 & 0 \end{vmatrix} = (K_1 \ K_2 \ K_3) \qquad (27)$$

Similar to the equation (25), the equation (27) can be rewritten every component as shown in the following equations (28)-1 to (28)-3:

$$pT_1 + V_1 \cdot C_1 = K_1 \qquad (28)\text{-}1$$

$$pT_2 + V_2 \cdot C_2 = K_2$$

$$(28)\text{-}2$$

$$pT_3 + 0 = K_3 \qquad (28)\text{-}3$$

wherein K1=K2=0, and K3=1.

Also, the condition of the equation (17)-3 can be expressed by the following equation (27):

$$J = TB = (T_1\ T_2\ T_3)(0\ B)\,t \quad (29)$$
$$= (T_1\ T_2\ T_3)(0\ B_2\ B_3)\,t$$
$$= T_2 \cdot B_2 + T_3 \cdot B_3$$

If the equations (28)-1 to (28)-3 are solved by the equations (29) and (26)-1 to (26)-3, the following equations (30)-1 to 30-4 can be obtained:

$$T_1 = -V_1 \cdot C_1/p \quad (30)\text{-}1$$

$$T_2 = -V_2 \cdot C_2/p \quad (30)\text{-}2$$

$$T_3 = 1/p \quad (30)\text{-}3$$

$$J = T_2 \cdot B_2 + T_3 \cdot B_3 \quad (30)\text{-}4$$

$$= B_2 \left( \frac{-V_2 \cdot C_2}{p} + \frac{\Gamma}{p} \right)$$

Then, substituting T2 and T3 obtained by the equations (30)-1 and (30)-3 for the equation (17)-3, the following equation (31) for stabilizing the observer circuit:

$$d = \Gamma - V_2 \cdot C_2 \quad (31)$$

From the equation (31), the following equations (32)-1 and (32)-2, which are the condition for constituting the observer circuit, can be obtained:

$$V_1 = E_1 \cdot p/d \quad (32)\text{-}1$$

$$E_2 = \left( \frac{d}{p}(\Gamma - d) - \frac{E_1 \cdot C_1}{d} \right)/C_2 \quad (32)\text{-}2$$

Next, the positional relationship among the drive coils $16a$ and $16b$ for making it possible to perform a correct tracking by only the linear motor 16, the position sensors $22a$ and $22b$, and the slide base 14, that is, lens actuator 12 (objective lens 10) will be reviewed.

Figure 20A:
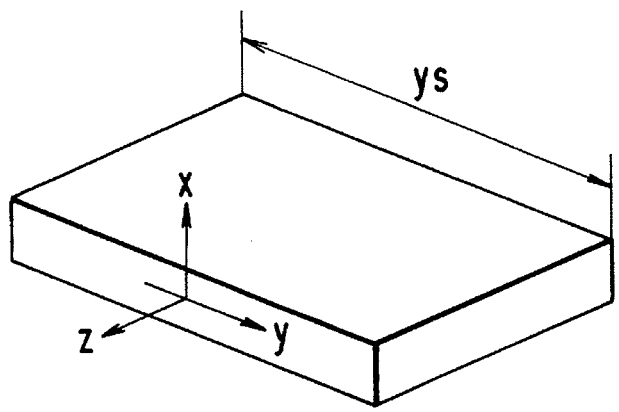
FIG. 20A is a view showing a relationship defining a position where the position sensor used for compensation for the drive current of FIG. 15 should be placed at the slide base, and a schematic view of a model for explaining secondary resonance, which is applied when the slide base is a substantially rectangular parallelepiped.
Figure 20B:
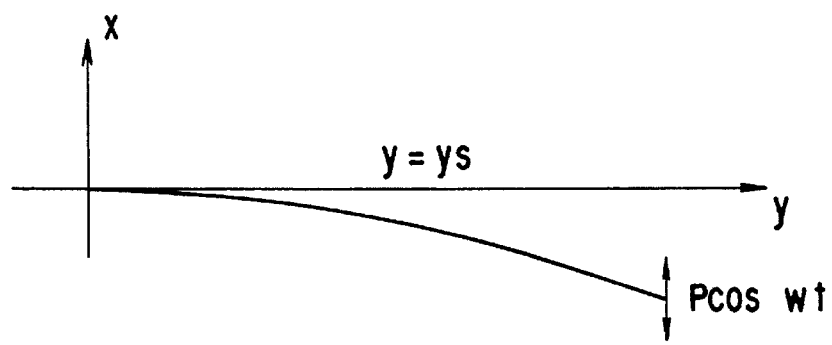
FIG. 20B is a model conceptually showing a state in which the model of FIG. 20A is replaced with a beam.

FIG. 20A is a model view in which the slide base 14 is replaced with a model such as a single beam.

In the model of the slide base shown in FIG. 20A, a variable x can be obtained as an amount in which a rigid motion component xg, which is analyzable as a rigid motion, and a vibration component xv, which is analyzable as motion resultant from vibration, are synthesized, that is, "x=xg+xv."

First, the vibration motion component XV will be reviewed.

If vibration having vibration frequency of "f=ω/2π" is applied to one end of the model, which corresponds to one of leg portions $14a$ and $14b$ of the slide base 14, to detect vibration at the position of a distance ys, the following equation (33) can be obtained:

$$xv(ys) = \sum_i \frac{Wi(ys) \cdot Pi}{(\omega_i^2 + j2\omega_i\, \zeta\omega - \omega^2)} \cdot \cos\omega t \quad (33)$$

wherein Wi: characteristic oscillation frequency mode, ωi: characteristic oscillation frequency, and Pi: force. Then, if solution up to i=2 is obtained from the equation (33), the following equation (34) can be obtained:

$$xv(ys) = \left| \frac{W_1(ys)}{(\omega_1^2 + j2\omega_1\, \zeta\omega - \omega^2)} + \frac{W_2(ys)}{(\omega_2^2 + j2\omega_2\, \zeta\omega - \omega^2)} \right| \cdot P\cos\omega t \quad (34)$$

In this case, under a condition that "x=a+bj", the equation (34) can be rewritten to the following equations (35)-1 an (35)-2:

$$a = \frac{W_1(ys) \cdot (\omega_1^2 - \omega^2)}{(\omega_1^2 - \omega^2)^2 + (2\omega_1\, \zeta\omega)^2} + \frac{W_2(ys) \cdot (\omega_2^2 - \omega^2)}{(\omega_2^2 - \omega^2)^2 + (2\omega_2\, \zeta\omega)^2} \quad (35)\text{-}1$$

$$b = \frac{W_1(ys) \cdot (-2\omega_1\, \zeta\omega)}{(\omega_1 - \omega^2)^2 + (2\omega_1\, \zeta\omega)^2} + \frac{W_2(ys) \cdot (-2\omega_2\, \zeta\omega)}{(\omega_2 - \omega^2)^2 + (2\omega_2\, \zeta\omega)^2} \quad (35)\text{-}2$$

Therefore, oscillation components gain G and phase θ can be obtained from the following equation (36), respectively:

$$G = \sqrt{(a^2 + b^2)} \quad (36)$$

$$\theta = \tan^{-1}(b/a)$$

Figure 20C:
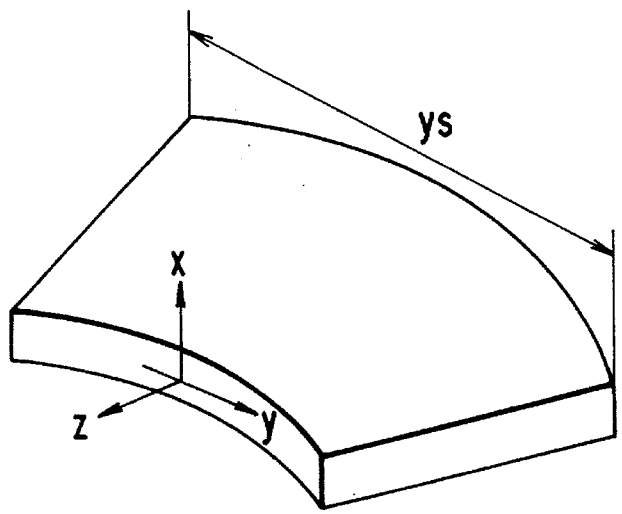
FIG. 20C is a view showing a relationship defining a position where the position sensor used for compensation for the drive current of FIG. 15 should be placed at the slide base, and a schematic view of a model for explaining secondary resonance, which is applied when the slide base has a shape different from the the rectangular parallelepiped.

The suitable position where the drive coils $16a$ and $16b$ and the position sensors $22a$ and $22b$ are arranged is the position at which secondary resonance, which is generated by the drive coils and the position sensors, can be reduced. Due to this, it is required that the phase θ obtained from the equation (36) be positioned at at least a compensable range by a phase compensation section (G13(s) of FIG. 13). In this case, it is required that a delay phase θ be smaller than 60° from an experiment. The oscillation components xv can be obtained even in a case the slide base 14 has a shape other than the beam shown in FIG. 20C.

The following will review the rigid motion component xg.

Figure 21:
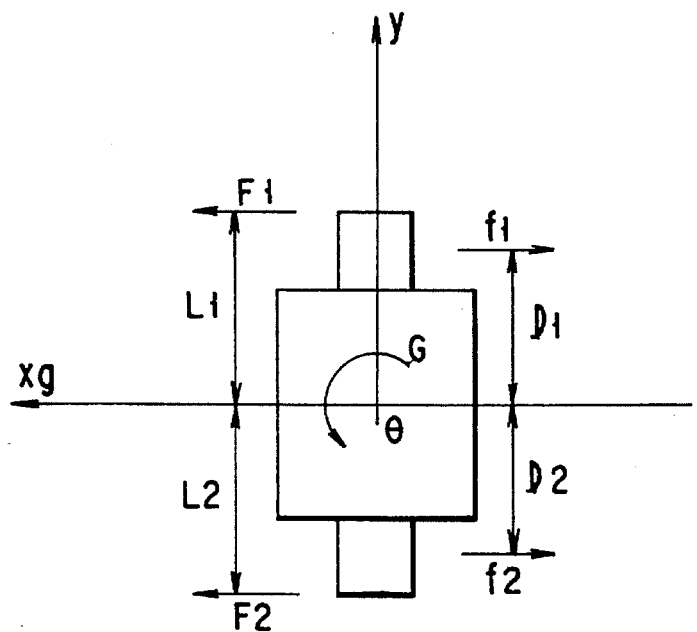
FIG. 21 is a schematic view showing a relationship between driving force of the model of the rectangular parallelepiped of FIG. 20A and controlling force.

FIG. 21 shows a model showing a state that force applied to the model of FIG. 20A is seen from a plane direction.

If a plurality of driving force and frictional force are applied to the system (model of FIG. 21), the following equations (37)-1 and (37)-2 can be obtained:

$$m \frac{d^2 xg}{dt^2} = (F_1 + f_1) + (F_2 + f_2) \quad (37)\text{-}1$$

$$l \frac{d^2 \theta}{dt^2} = F_1 \cdot L_1 + f_1 \cdot l_1 + F_2 \cdot L_2 + f_2 \cdot l_2 \quad (37)\text{-}2$$

From the equations (37)-1 and (37)-2, xg and θ can be obtained by the following equations (38)-1 and (38)-2:

$$xg = (x_1 \cdot L_1 + x_2 \cdot L_2)/(L_1 + L_2) \quad (38)\text{-}1$$

$$\theta = (x_1 - x_2)/(L_1 + L_2) \quad (38)\text{-}2$$

At this time, in order to cancel frictional force $(f_1 + f_2)$ of FIG. 21 and controlling force $(fc_1 + fc_2)$ each other, influence of friction can be removed by optimizing the equations (37)-1 and (37)-2.

In this case, for detecting resultant force of frictional force $(f_1 + f_2)$ and controlling force $(fc_1 + fc_2)$, the following equations (39)-1 and (39)-2 can be established:

$$m \frac{d^2 xg}{dt^2} = (F_1 + f_1) + (F_2 + f_2) - (fc_{12}) \quad (39)\text{-}1$$

$$= (F_1 + F_2) + (f_1 + f_2 - fc_{12})$$

$$l \frac{d^2 \theta}{dt^2} = F_1 \cdot L_1 + f_1 \cdot l_1 + F_2 \cdot L_2 + f_2 \cdot l_2 \quad (39)\text{-}2$$

$$\cong (F_1 + f_1)L_1 + (F_2 + f_2)L_2$$

wherein $fc_{12}$ shows synthetic controlling force defined to correspond to an estimation value of resultant force obtained by $f_1$ and $f_2$, and $l_1$ and $l_2$ are a distance from the support section and center of gravity.

For independently detecting resultant force of frictional force $(f_1 + f_2)$ and controlling force $(fc_1 + fc_2)$, the following equations (40)-1 and (40)-2 can be established.

$$m \frac{d^2 xg}{dt^2} = (F_1 + f_1) + (F_2 + f_2) - f_{c1} - f_{c2} \quad (40)\text{-}1$$
$$= (F_1 + f_1 - f_{c1}) + (F_2 + f_2 - f_{c2})$$
$$1 \frac{d^2 \theta}{dt^2} = (F_1 + f_1 - f_{c1}) L_1 + (F_2 + f_2 - f_{c2}) L_2 \quad (40)\text{-}2$$

As a result of reviewing the positions of the frictional force $f_1$ and $f_2$ and controlling force $fc_1$ and $fc_2$ based on comparison between the position of the sensor (not shown) on basis of the equations (39)-1 and (39)-2 and that of the sensor (FIGS. 1, 2A, and 2B), it can be confirmed that position of the sensor, which is based on the equations (40)-1 and (40)-2, is preferable. In other words, the position where the sensor should be provided is defined to be in the vicinity of each of the drive coils 16a and 16b where moment is generated, preferably the center of the length of each of the drive coil 16a and 16b.

The following will explain the sequence, which is different from the control of the linear motor 16 of FIG. 13.

Figure 22:
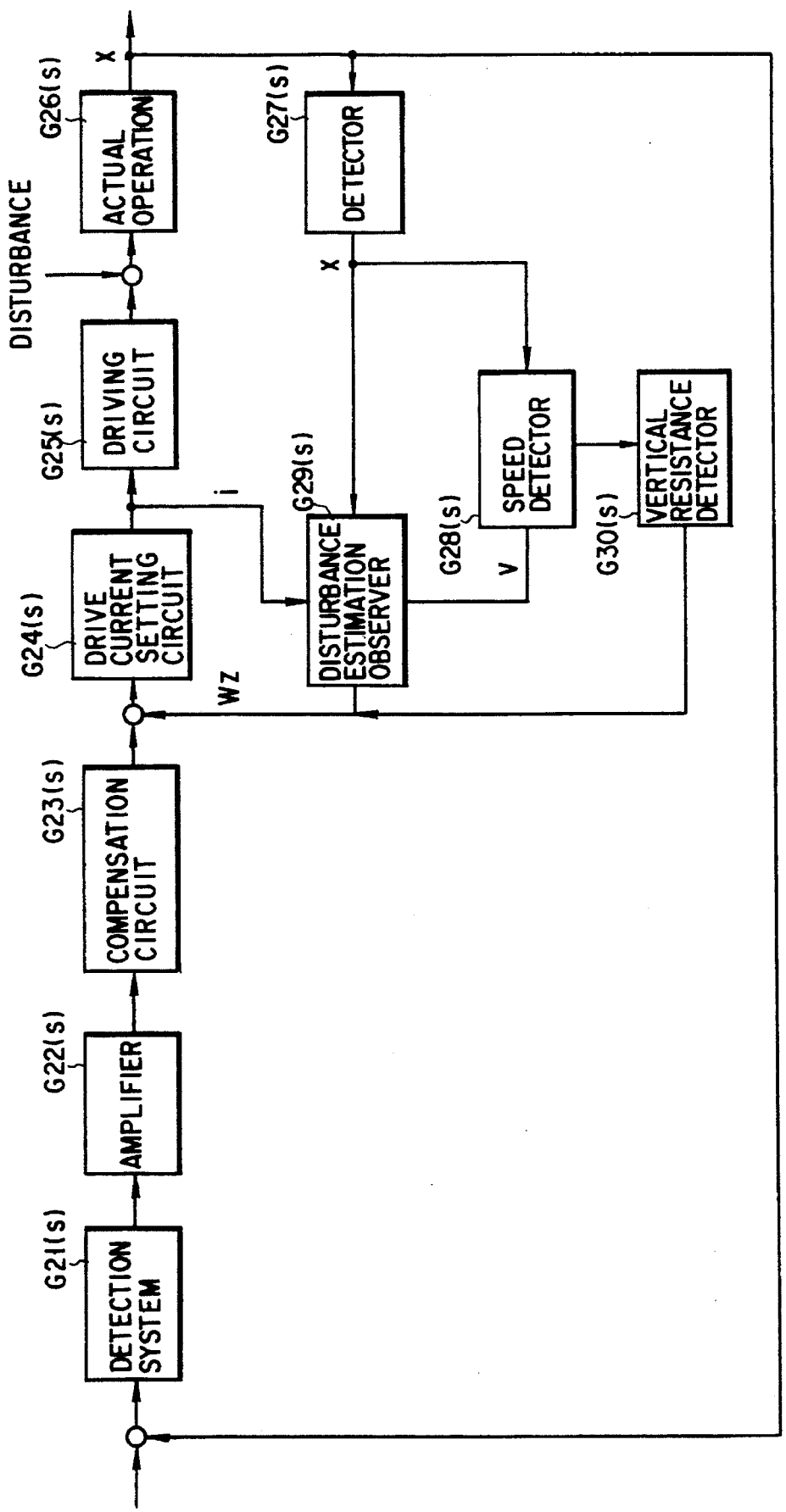
FIG. 22 is a block diagram showing a modification of the track control sequence of the present invention shown in FIG. 13.

FIG. 22 is a block diagram showing the sequence of the control of the linear motor of another embodiment of the present invention.

As shown in FIG. 22, first, a component of an tracking error, that is, displacement of the track caused by eccentricity of the optical disk D is detected by a detection system G21(s), and a result is amplified by an amplifier G22(s). Then, an amount of compensation for the position of the lens actuator 12 (objective lens 10) can be obtained in accordance with the displacement by a compensation circuit G23(s). Sequentially, a current value to be supplied to the drive coils 16a and 16b is obtained by a drive current setting circuit G24(s), and a predetermined driving force is supplied to the drive coils 16a and 16b by a drive circuit 25G(s). Thereby, the lens actuator 12 (objective lens 10), that is, slide base 14 is moved in a predetermined direction by an actual operation G26(s), and an amount of movement of the slide base 14, that is, the present position can be detected by a detector G27(s). Moreover, a speed at which the slide base 14 is moved, that is, a moving speed of the linear motor 16 is detected by a speed detector G28(s).

Then, the following will review an inertia friction μmg generated by influence of vertical resistance applied onto the lens actuator 12 (objective lens 10) supported by the slide base 14.

The inertia friction μmg detected by a vertical resistance detector G30(s) can be obtained by synthesizing two friction generated by the movement of the slide base 14 and that of the lens actuator 12. The inertia friction μmg has directivity along the movement of the slide base 14.

In the sequence of FIG. 22, as explained in FIG. 13, if the slide base 14 moved by the actual operation G26(s) does not reach the target track, a tracking error or a step out of track is generated.

In order not to generate the tracking error and the step out of track, all factors in causing that the slide base 14 moved by the actual operation G26(s) does not reach the target track are regarded as disturbance. Then, regarding the amount of movement of the slide base 14 changed based on disturbance, an amount of change is estimated by a disturbance estimation observer circuit G29(s) to compensate for the drive current to be supplied to the drive coils 16a and 16b. In this case, an amount of compensation obtained by the disturbance estimating observer circuit G29(s) is summed with the result obtained by the vertical resistance detector 30G(s) to be fed back to the front stage of the drive current setting circuit G24(s) as a disturbance canceling signal.

Figure 23:
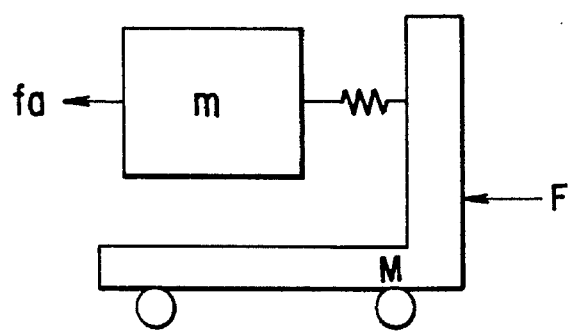
FIG. 23 is a model showing an example of friction of prior art including inertia friction generated by influence of vertical resistance and a model showing a friction compensation of the present invention.
Figure 23:
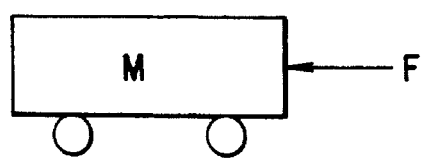

FIG. 23 is a model showing an example of friction of prior art including inertial friction generated by influence of vertical resistance and a model showing a friction compensation of the present invention. According to the FIG. 23, the model of the optical head 2 of the present invention is simply in contrast to prior art optical head.

Figure 24A:
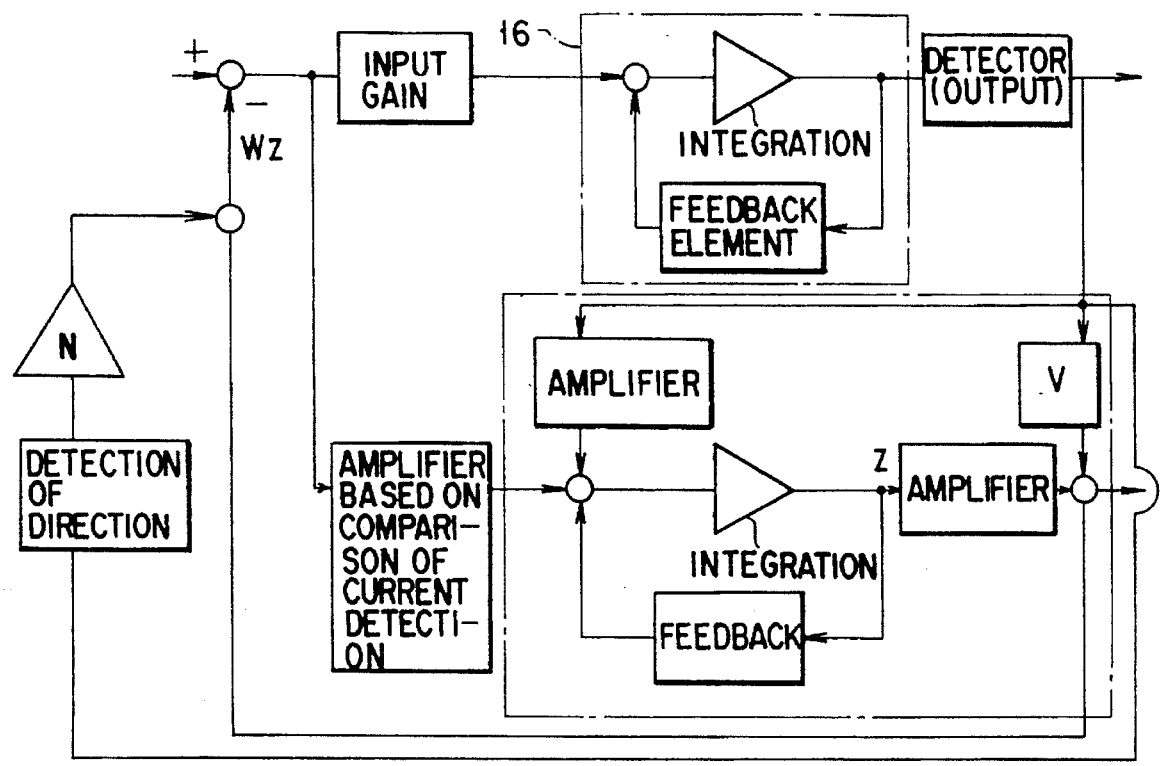
FIG. 24A is a block diagram showing one example of an observer circuit, which is used to attain the track control sequence of FIG. 22, by a vector.
Figure 24B:
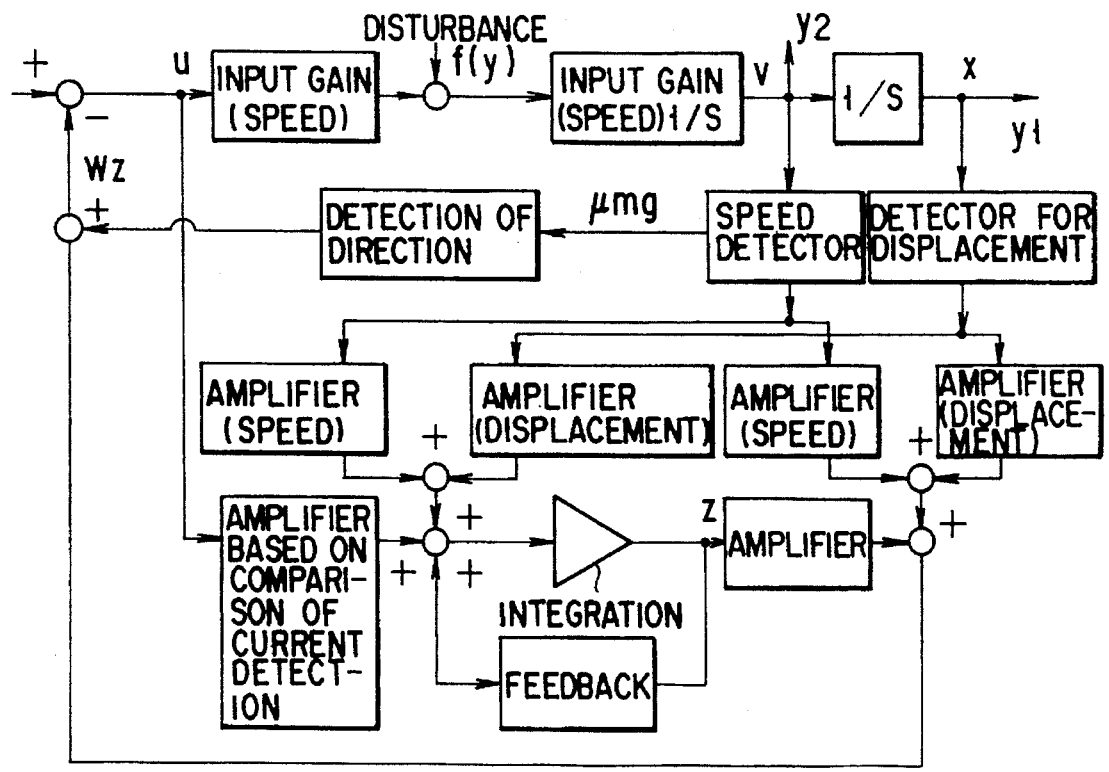
FIG. 24B is a block diagram showing the observer circuit of FIG. 24A as a scalar.

FIGS. 24A and 24B show disturbance estimation observer circuits for estimating the amount of change shown by FIG. 22. FIG. 24A shows one example of the disturbance estimation observer circuit by a vector, and FIG. 24B is a view in which the vector shown in FIG. 24A is divided every component, and shown by a scalar. The inertia friction μmg is shown by N in FIG. 24A.

Similar to the first embodiment using the equations (1) to (15) and FIGS. 13, 14A, 14B, 16 and 19, the state of equation (18) showing friction between the guide shaft and the bearing in accessing and tracking is established.

If D is a stable matrix (real number section of characteristic value of D is negative) in equation (18), the observer circuit constant z is converged to Tx and w is converged to Kx, so that an amount of frictional compensation w' including influence of the inertia friction μmg can be shown as follows:

$$w' = \eta \pm \mu mg \quad (41)$$

Therefore, the equation (19) can be expressed by the following equation (42), thereby obtaining the amount of frictional compensation w' including influence of the inertia friction μmg.

$$w' = \eta \pm \mu mg \quad (42)$$

Figure 25:
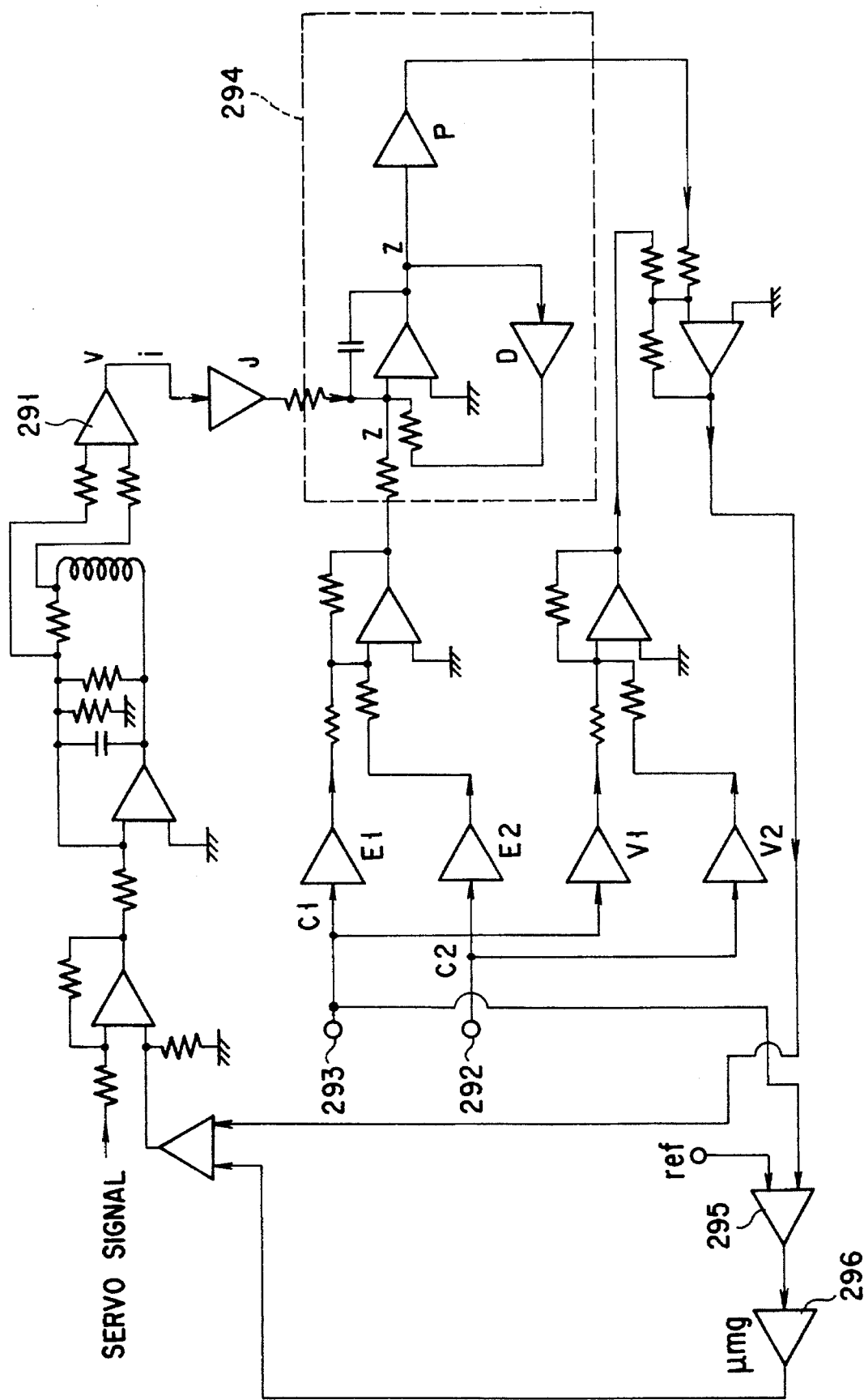
FIG. 25 is a circuit diagram showing an example in which the disturbance estimation observer circuit of FIG. 19 is expanded based on one example of the track control sequence of the present invention shown in FIG. 22.

FIG. 25 is a circuit diagram showing one example of a preferable circuit functioning as a disturbance estimating observer circuit explained by use of the vector or scalar.

Similar to the first embodiment explained by use of FIG. 19, in the disturbance estimating observer circuit of FIG. 25, a coil drive current flowing to each of the drive coils 16a and 16b of the linear motor is detected by a current measuring amplifier 291. Each of the present position and the moving speed of the slide base 14 (objective lens 10) obtained by the position/speed detection circuit 120 is inputted to a displacement input terminal 292 and a speed input terminal 293 based on the output of the position detectors 25a and 25b.

The level of the drive current calculated by the current measuring amplifier 291 and the present position and the speed inputted to the displacement input terminal 292 and the speed input terminal 293 are inputted to an observer circuit (integrator) 294 to obtain an estimation value of the disturbance component. The sum of the detected value of the displacement and that of the driving current, a sum of the detected value of the speed and that of the driving current are obtained, and integrated, respectively. Moreover, the detected value of the displacement and that of the speed are added thereto by an adder connected to a back stage, so that an obtained result is converted to the amount of frictional compensation w.

A part of the output of the amount of speed is picked up, and the result is compared with a reference signal ref inputted to the comparator 295 to discriminate the directivity, and an obtained result is amplified by a μmg amplifier 296, since the inertia friction μmg generated in the slide base 14 by influence of the vertical resistance applied onto the lens actuator (objective lens 10) is defined.

As mentioned above, according to the optical head access mechanism of the present invention, the drive coils, which provide propulsive force to move the slide base holding the objective lens, that is, the lens actuator and the position sensor, which detects the position of the slide base, are arranged at a position where influence of secondary resonance caused by the vibration of the moving section can be reduced, and all driving force applied to the slide base and frictional force corresponding to the driving force can be surely detected.

The position sensor can detect the present position (displacement) and the moving speed of the slide base in accordance with the level of the driving current supplied to the drive coils. Due to this, in the drive control when the slide base is moved to the target track, influence of frictional force, which causes the tracking error, can be correctly detected.

Then, the compensation driving current is supplied to the drive coils in advance to generate driving force corresponding to driving force lost by frictional force. Thereby, the target track, which is displaced by eccentricity of the optical disk, can be tracked well.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A linear drive mechanism comprising:

an objective lens for focusing light on a recording surface of an optical disk;

a lens actuator for movably holding said objective lens in a direction perpendicular to said recording surface;

a slide base for movably holding said lens actuator to be parallel to said recording surface;

driving coils, placed at a predetermined position of said slide base, for providing propulsive force for moving said slide base;

guide rails for guiding said slide base when said slide base is moved to be parallel to said recording surface;

sliding members, fixed to a predetermined position between said slide base and said guide rails, for reducing friction between said slide base and said guide rails;

linear scales, provided at a predetermined range in connection with an area where said slide base is movable to be along said guide rails, for outputting a signal corresponding to a present position of said slide base;

a coil current supplying circuit for supplying a driving current to said drive coils;

position sensors, provided at a predetermined position of said slide base, for detecting the present position of said slide base in connection with said linear scales;

frictional force estimating circuit for estimating level of frictional force generated between said guide rails and said moving members based on the present position of said slide base detected by said position sensors, a level of the driving current supplied to said drive coils from said coil current supply current, and a speed at which said slide base is moved; and a drive current compensation circuit for compensating for the level of the drive current supplied to said drive coils from said coil current supply circuit so as to cancel the level of the frictional force estimated by said frictional force estimating circuit.

2. The mechanism according to claim 1, wherein said drive coils are provided to be away from a center of said slide base with an equal distance in a direction perpendicular to a direction where said slide base is moved.

3. The mechanism according to claim 1, wherein said sliding members are provided to be away from a center of said slide base with an equal distance at an end portion of a longitudinal direction of said drive coils.

4. The mechanism according to claim 1, wherein said position sensors are provided at substantially a center of a longitudinal direction of each of said drive coils.

5. The mechanism according to claim 1, wherein said position sensors are provided at a position where a surface including an optical axis of said objective lens and a surface where said slide base is moved are crossed each other.

6. The mechanism according to claim 1, wherein said position sensors are provided to be combined with said linear scales to cross a predetermined position of said linear scales, and said position sensors output a signal corresponding to the present position of said slide base and the speed at which said slide base is moved.

7. The mechanism according to claim 1, wherein said frictional force estimating circuit includes a part for estimating influence of a vertical resistance working between said lens actuator and said slide base.

8. The mechanism according to claim 1, wherein said coil current supply circuit supplies a coil driving current including a plurality of control patterns to said drive coils.

9. The mechanism according to claim 8, wherein said coil current supply circuit supplies the coil driving current movable a moving distance defined in accordance with the number of tracks provided between a target track to be moved and the position of the present track on which said light is focused through said objective lens.

10. The mechanism according to claim 8, wherein said coil current supply circuit supplies the coil driving current movable a moving distance defined in accordance with a characteristic variation of the position of the present track where said light is focused through said objective lens by influence of concentricity of the recording surface of said optical disk.

11. The mechanism according to claim 6, wherein said coil current supply circuit supplies a coil driving current including a plurality of control patterns to said drive coils.

12. The mechanism according to claim 11 wherein said coil current supply circuit supplies the coil driving current movable a moving distance defined in accordance with the number of tracks provided between a target track to be moved and the position of the present track on which said light is focused through said objective lens.

13. The mechanism according to claim 11, wherein said coil current supply circuit supplies the coil driving current movable a moving distance defined in accordance with a characteristic variation of the position of the present track where said light is focused through said objective lens by influence of concentricity of the recording surface of said optical disk.

14. The mechanism according to claim 7, wherein said coil current supply circuit supplies a coil driving current including a plurality of control patterns to said drive coils.

15. The mechanism according to claim 14, wherein said coil current supply circuit supplies the coil driving current movable a moving distance defined in accordance with the number of tracks provided between a target track to be moved and the position of the present track on which said light is focused through said objective lens.

16. The mechanism according to claim 14, wherein said coil current supply circuit supplies the coil driving current movable a moving distance defined in accordance with a characteristic variation of the position of the present track where said light is focused through said objective lens by influence of concentricity of the recording surface of said optical disk.

17. A linear drive mechanism comprising:

focusing means for focusing light on a recording surface of a recording medium;

holding means for movably holding said focusing means in a direction perpendicular to said recording surface;

moving means for moving said holding means to be parallel to said recording surface;

position detecting means for detecting a position of said moved moving means;

driving means for driving said moving means;

guiding means for guiding said moving means when said moving means is moved to be parallel to said recording surface; and compensating means for estimating a level of a driving force canceling component generated between said guiding means and said moving means, and a level of a vertical resistance working between said holding means and said moving means, based on the position of said moving means detected by said position detecting means, a level of driving force supplied to said moving means from said driving means, and a speed at which said moving means is moved, so as to compensate for the level of driving force supplied to said moving means from said driving means.

18. A linear drive mechanism comprising:

focusing means for focusing light on a recording surface of a recording medium;

holding means for movably holding said focusing means in a direction perpendicular to said recording surface;

moving means for moving said holding means to be parallel to said recording surface;

position detecting means for detecting a position of said moved moving means;

driving means for driving said moving means;

guiding means for guiding said moving means when said moving means is moved to be parallel to said recording surface; and compensating means for estimating a level of a driving force canceling component generated between said guiding means and said moving means based on the position of said moving means detected by said position detecting means, a level of driving force supplied to said moving means from said driving means, and a speed at which said moving means is moved, so as to compensate for the level of driving force supplied to said moving means from said driving means.

19. A data processor for irradiating a data recording medium having a track having data recorded thereon with a light beam to reproduce data, comprising:

means for irradiating the track of said data recording medium with the light beam;

linear motor means for moving said irradiating means in a direction crossing the track so as to flow the track with the light beam, said linear motor means including a movable section movably provided to support said irradiating means and means for guiding the movable section to be moved in the direction crossing said track;

means for supplying drive force for moving said movable section of said linear motor means to said linear motor;

first means for detecting a moving position of said movable section of said linear motor means;

second means for detecting a moving speed of said movable section of said linear means;

third means for detecting drive force to be supplied to said linear motor means by said supplying means;

means for estimating frictional force to be applied to said guiding means of said linear motor means based on said detected moving position, moving speed, and drive force; and means for correcting drive force to be supplied to said linear motor means by said supplying means based on frictional force estimated by said estimating means.

* * * * *